US010778547B2

(12) United States Patent
Halepovic et al.

(10) Patent No.: US 10,778,547 B2
(45) Date of Patent: Sep. 15, 2020

(54) SYSTEM FOR DETERMINING A PREDICTED BUFFER CONDITION BASED ON FLOW METRICS AND CLASSIFIER RULES GENERATED IN RESPONSE TO THE CREATION OF TRAINING DATA SETS

(71) Applicants: AT&T Mobility II LLC, Atlanta, GA (US); AT&T Intellectual Property I, L.P., Atlanta, GA (US)

(72) Inventors: Emir Halepovic, Somerset, NJ (US); Eric Petajan, Watchung, NJ (US); Vengatanathan Krishnamoorthi, Linkoping (SE); Niklas Carlsson, Linkoping (SE)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/963,354

(22) Filed: Apr. 26, 2018

(65) Prior Publication Data
US 2019/0334794 A1    Oct. 31, 2019

(51) Int. Cl.
*H04L 12/26*    (2006.01)
*H04L 29/08*    (2006.01)
(Continued)

(52) U.S. Cl.
CPC .............. *H04L 43/08* (2013.01); *G06N 20/00* (2019.01); *H04L 41/147* (2013.01);
(Continued)

(58) Field of Classification Search
CPC ......... H04L 43/08; H04L 67/28; H04L 67/42; H04L 67/02; H04L 47/24; H04L 41/147; H04L 43/026; G06N 20/00
See application file for complete search history.

(56) References Cited

U.S. PATENT DOCUMENTS 6,910,079 B2    6/2005    Zimmermann et al.
7,843,818 B2    11/2010   Chu et al.
(Continued)

FOREIGN PATENT DOCUMENTS

WO    WO 2002/033558 A1    4/2002
WO    WO 2016/080884 A1    5/2016
WO    WO 2016/123497 A1    8/2016

OTHER PUBLICATIONS

Duanmu et al.; "A Quality-of-Experience Index for Streaming Video"; IEEE Journal of Selected Topics in Signal Processing; vol. 11.1; 2017; 13 pages.
(Continued)

*Primary Examiner* — Daniel C. Murray
(74) *Attorney, Agent, or Firm* — BakerHostetler

(57) ABSTRACT

A buffer classification system calculates first flow metrics for a first flow in response to receiving first packet level data. The system in response to receiving HTTP information, generates buffer emulation data and creates one or more data training sets using the first flow metrics and buffer emulation data, wherein training data used to create the one or more training data sets is further generated by computing an average throughput per second observed over different time windows during a video playback. The system in response to creating the one or more training data sets, generates one or more classifier rules used to determine a buffer condition of a flow. The system in response to receiving second packet level data, calculates second flow metrics for a second flow and predicts a buffer condition for the second flow based on the second flow metrics and the one or more classifier rules.

20 Claims, 21 Drawing Sheets

(51) Int. Cl.
*H04L 29/06* (2006.01)
*G06N 20/00* (2019.01)
*H04L 12/24* (2006.01)
*H04L 12/851* (2013.01)

(52) U.S. Cl.
CPC ............ *H04L 43/026* (2013.01); *H04L 47/24* (2013.01); *H04L 67/02* (2013.01); *H04L 67/28* (2013.01); *H04L 67/42* (2013.01)

(56) References Cited

U.S. PATENT DOCUMENTS

| | | | |
|---|---|---|---|
| 7,974,489 B2 | 7/2011 | Kakarala et al. | |
| 8,237,764 B1 | 8/2012 | Chen et al. | |
| 8,477,843 B2 | 7/2013 | Nie et al. | |
| 8,874,777 B2 | 10/2014 | Ma et al. | |
| 9,032,427 B2* | 5/2015 | Gallant | H04L 41/5038 725/9 |
| 9,124,642 B2* | 9/2015 | Choudhury | H04L 65/4084 |
| 9,191,284 B2* | 11/2015 | Kordasiewicz | H04L 65/1083 |
| 9,380,091 B2* | 6/2016 | Bao | H04L 65/605 |
| 9,485,298 B2* | 11/2016 | Joch | H04N 21/2401 |
| 9,503,491 B2* | 11/2016 | Hurst | H04L 65/60 |
| 9,538,220 B2* | 1/2017 | ElArabawy | H04N 21/26208 |
| 9,571,549 B2* | 2/2017 | Bao | H04L 65/605 |
| 9,600,779 B2* | 3/2017 | Hoover | G06Q 30/06 |
| 9,665,713 B2* | 5/2017 | Avasarala | G06F 21/56 |
| 9,866,384 B2 | 1/2018 | Herrero | |
| 10,178,181 B2* | 1/2019 | Ben-Nun | H04L 67/141 |
| 2008/0189227 A1* | 8/2008 | Kandregula | G06N 20/00 706/10 |
| 2010/0287228 A1* | 11/2010 | Hauser | G06F 21/36 709/203 |
| 2012/0327779 A1* | 12/2012 | Gell | H04L 47/2475 370/238 |
| 2013/0286879 A1* | 10/2013 | ElArabawy | H04N 21/26208 370/252 |
| 2014/0082146 A1* | 3/2014 | Bao | H04L 65/605 709/219 |
| 2014/0181266 A1* | 6/2014 | Joch | H04L 65/605 709/219 |
| 2014/0280514 A1* | 9/2014 | Wu | H04L 69/329 709/203 |
| 2014/0365644 A1* | 12/2014 | Tanaka | H04L 67/12 709/224 |
| 2016/0078347 A1* | 3/2016 | Salajegheh | G06N 5/04 706/12 |
| 2016/0078362 A1* | 3/2016 | Christodorescu | G06F 21/566 706/12 |
| 2016/0156563 A1 | 6/2016 | Timner et al. | |
| 2016/0156942 A1* | 6/2016 | Bao | H04L 65/605 725/116 |
| 2016/0164788 A1* | 6/2016 | Goel | H04L 43/0876 709/228 |
| 2016/0232353 A1* | 8/2016 | Gupta | G06F 21/566 |
| 2016/0253498 A1* | 9/2016 | Valencia | G06F 21/554 726/23 |
| 2016/0283859 A1 | 9/2016 | Fenoglio et al. | |
| 2016/0295298 A1* | 10/2016 | Lee | H04N 21/23439 |
| 2016/0379136 A1* | 12/2016 | Chen | G06F 21/552 706/12 |
| 2017/0070551 A1* | 3/2017 | Phillips | H04L 65/4076 |
| 2017/0093648 A1* | 3/2017 | ElArabawy | H04L 41/5067 |
| 2017/0171279 A1 | 6/2017 | Zhang | |
| 2018/0048524 A1 | 2/2018 | Mendoza et al. | |
| 2018/0183724 A1* | 6/2018 | Callard | H04L 41/08 |
| 2018/0205705 A1* | 7/2018 | Kupferschmied | H04L 63/0281 |
| 2019/0007280 A1* | 1/2019 | Sarangam | H04L 41/5003 |
| 2019/0104324 A1* | 4/2019 | Han | G06T 19/006 |
| 2019/0130134 A1* | 5/2019 | Gonzalez Sanchez | H04L 63/0281 |
| 2019/0354891 A1* | 11/2019 | Gusev | H04L 67/1002 |

OTHER PUBLICATIONS

Shin et al.; "Dynamic QoS Mapping Control for Streaming Video in Relative Service Differentiation Networks"; Transactions on Emerging Telecommunications Technologies; vol. 12; 2001; p. 217-229.

Yin et al.; "A Control-Theoretic Approach for Dynamic Adaptive Video Streaming over HTTP"; ACM SIGCOMM Computer Communication Review; vol. 45; 2015; 14 pages.

Yin et al.; "Toward a Principled Framework to Design Dynamic Adaptive Streaming Algorithms over HTTP"; ACM HotNets-XIII; Oct. 2014; 7 pages.

Yang et al.; "Online Buffer Fullness Estimation Aided Adaptive Media Playout for Video Streaming"; IEEE Transactions on Multimedia; vol. 13; Oct. 2011; p. 1141-1153.

Lookabaugh et al.; "Security Analysis of Selectively Encrypted MPEG-2 Streams"; Multimedia Systems and Applications VI; vol. 5241; Int'l Society for Optics and Photonics; 2003; 12 pages.

Winkler et al.; "The Evolution of Video Quality Measurement: From PSNR to Hybrid Metrics"; IEEE Trans. Broadcasting; vol. 54; Sep. 2008; 9 pages.

* cited by examiner

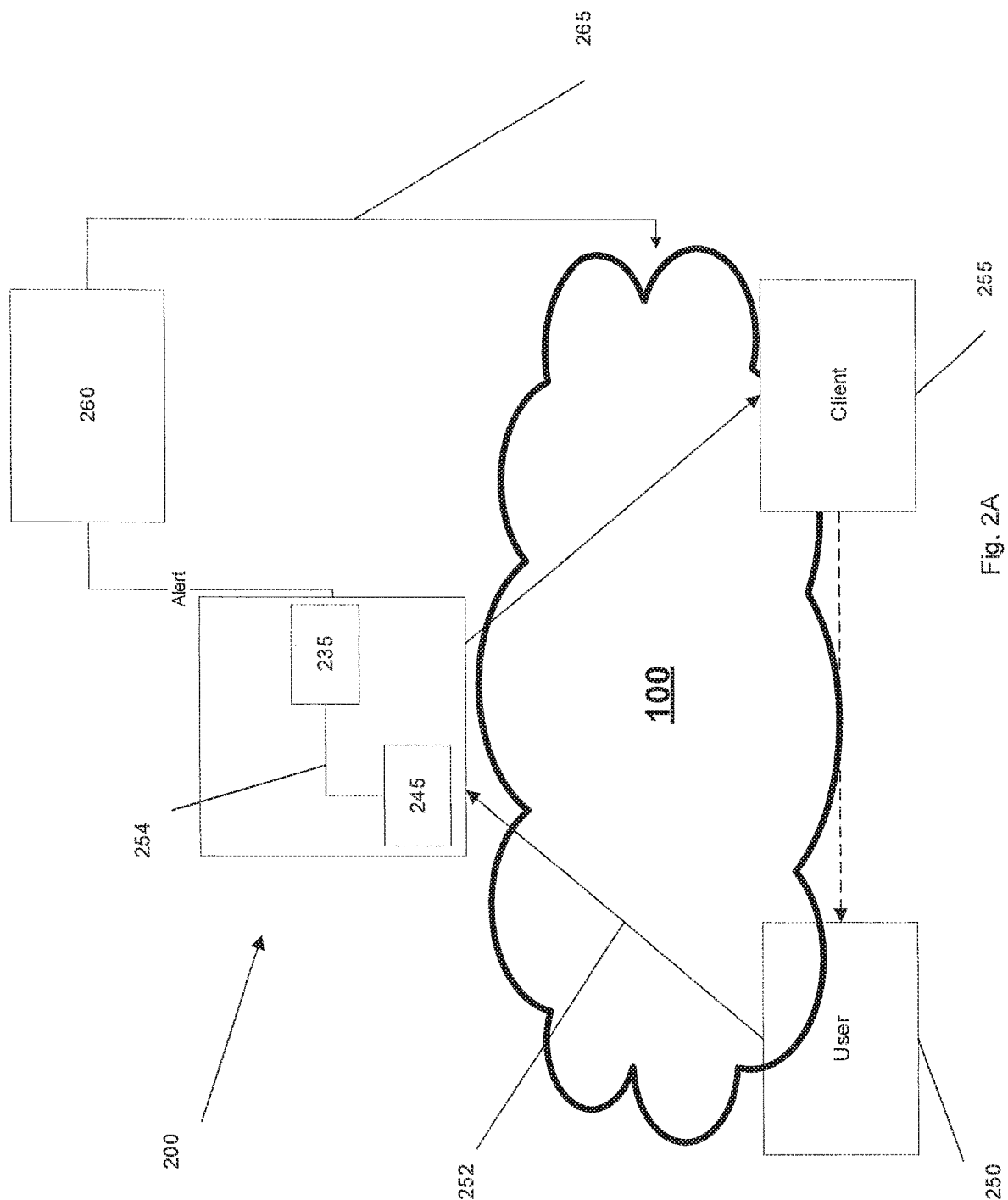

SYSTEM FOR DETERMINING A PREDICTED BUFFER CONDITION BASED ON FLOW METRICS AND CLASSIFIER RULES GENERATED IN RESPONSE TO THE CREATION OF TRAINING DATA SETS

TECHNICAL FIELD

This disclosure relates generally to network management and, more specifically, to buffer conditions. In particular, the disclosure relates to a buffer classification system that includes a buffer emulation module that labels a sample set of flows extracting non-encrypted information from a proxy and obtains calculating metrics from an encrypted flow to develop a training dataset(s) from which classification rules are extracted to provide video buffer conditions and client performance for a user's flow.

BACKGROUND

Stalls during video playback are perhaps the most important indicator of a client's viewing experience. To provide the best possible service, a proactive network operator may therefore want to know the streaming clients' buffer conditions and use this information to help avoid stalls due to empty buffers. However, estimation of clients' buffer conditions is complicated by most streaming services being rate adaptive, and many of them also encrypted. Rate adaptation, implemented by HTTP-based Adaptive Streaming (HAS) clients, reduces the correlation between network throughput and client buffer conditions. Usage of HTTPS prevents operators from observing information related to individual requests for video chunks, such as indications of rate adaptation or other HTTP-level information.

To properly provision their networks, operators need to understand the characteristics of application traffic mix in addition to manage data volume demand. As networks go through low to high utilization phases, e.g. due to diurnal patterns, the users' Quality of Experience (QoE) may vary as data flows compete for bandwidth, especially in more constrained types of networks, such as those with wireless last mile. To provide users with high QoE when operating at moderate-to-high utilization, it is therefore important to understand user experience and real-time requirements associated with different network flows.

Currently, various flow classification techniques have been applied that map flows to the underlying services they provide. For example, by classifying flows into categories such as real-time streaming service and peer-to-peer downloads, network providers have been able to prioritize real-time streaming services at times when the more elastic demands of peer-to-peer networks have used up much of the available bandwidth. Since video streaming is responsible for the majority of today's network traffic, classifying all video flows into a single class (without further differentiation within this dominating class) is not much help.

There is a need to continually and individually classify flows based on their clients' current buffer conditions. Streaming clients often have highly heterogeneous real-time requirements, and these requirements typically change over the duration of a playback session. For example, streaming clients that have built up a large playback buffer may be highly tolerant to delays in receiving video data (e.g., compared to web clients that often expect immediate loading of websites), while clients with drained buffers may have tighter real-time requirements, in that they need additional video data sooner to avoid stalls (due to empty buffer events). In addition, the real-time requirements of a client may quickly change from critical to low priority, as the buffer builds up again. The importance of differentiating between these clients becomes particularly clear when considering that stalls (and their duration) is the factor that has the largest impact on clients' QoE.

The problem of classifying video streaming flows based on the clients' current buffer conditions (i.e., their current real-time requirements) is further complicated by high usage of HTTPS combined with rate adaptation in almost all popular streaming services. First, with HAS, each video quality encoding is typically split into smaller chunks that can be independently downloaded and played. The use of multiple encodings of each chunk allows efficient quality adaptation on the clients. This helps clients adapt to network conditions and reduce the number of playback stalls, but also decreases correlation between packet-level throughput and buffer conditions.

Second, increasingly many video streaming services, including YouTube and Netflix, deliver all or most of their content using HTTPS. Usage of HTTPS prevents operators from observing HTTP requests for video chunks and associated meta-data, restricting classifiers to TCP/IP packet-level information. This restriction presents additional challenges in the context of HAS, as the rate-adaptive nature of HAS complicates the relationship between packet-level throughput and buffer level conditions. As argued later in the paper, this challenge is further augmented in services such as YouTube, where different number of chunks may be requested simultaneously (e.g., using a single range request).

The disclosure includes examples addressing at least one of these problems.

SUMMARY

The following disclosure generally relates to a buffer monitoring system having a buffer emulation module that uses sample flows to develop a classification that can be applied to a user flow to determine buffer performance for the user flow.

According to an example, the disclosure generally provides a buffer classification system comprising: a buffer classification system comprising: a buffer emulator; a metrics calculator; a learning module; a training module; a classification module, wherein the buffer emulator is connected to a proxy on a network, the proxy is in communication with a client and a server; the buffer emulator and metrics calculator are connected to the proxy; the buffer emulator emulating a buffer condition of the proxy; the metrics calculator is configured to obtain at least one measurement from a flow between the proxy and the client; wherein the learning module is configured to map the buffer condition to the at least one measurement, and communicates a mapped metric to the training module; wherein the training module is configured to define at least one classifier rule to predict a buffer condition from a calculated metric, and wherein the training module transmits the at least one classifier rule to a classifier module, the classifier module having an input configured to receive a user flow, the classifier being configured to apply the at least one classifier rule to predict a buffer condition based on the user flow.

Still another example provides a network device comprising: a processor, an input/output device coupled to the processor, and a memory coupled with the processor, the memory comprising executable instructions that when executed by the processor cause the processor to effectuate operations comprising: instantiating a buffer emulator;

instantiating a first metrics calculator; connecting the buffer emulator and first metrics calculator to the trusted proxy, wherein the buffer emulator emulates a buffer condition in the trusted proxy based on a trusted proxy flow, and wherein the first metrics calculator measures flow metrics from the trusted proxy flow; mapping the flow metrics and the buffer condition from the trusted proxy to define at least one classifier rule; and applying the at least one classifier rule to a user flow to define a buffer condition for the user flow.

Another example provides a method comprising: instantiating a buffer emulator; instantiating a first metrics calculator; connecting the buffer emulator and first metrics calculator to a trusted proxy, wherein the buffer emulator emulates a buffer condition in the trusted proxy based on a trusted proxy flow, and wherein the first metrics calculator measures flow metrics from the trusted proxy flow; mapping the flow metrics and the buffer condition from the trusted proxy to define at least one classifier rule; and applying the at least one classifier rule to a user flow to define a buffer condition for the user flow.

BRIEF DESCRIPTION OF THE DRAWINGS

In the following description, for purposes of explanation, numerous specific details are set forth to provide an understanding of the variations in implementing the disclosed technology. However, the instant disclosure may take many different forms and should not be construed as limited to the examples set forth herein. Where practical, like numbers refer to like elements throughout.

FIG. 2A is a representation similar to FIG. 2 showing further details of a buffer classification system according to an example.

DETAILED DESCRIPTION

The disclosure relates to network management and particularly consideration of buffer conditions. Buffer conditions may occur in a number of contexts as data is transmitted across a network. The examples herein discuss buffer prediction for video streaming. Video streaming is prevalent and provided through various sources including dedicated content providers and aggregators that receive video content from multiple sources. It will be understood that the buffer conditions predicted in the examples below may be applied to other contexts beyond video streaming. As described in more detail below, a buffer prediction system estimates buffer conditions for clients streaming video on a network. The network may include a telecommunications network, software defined network, local area network, and the like. Examples of various network are provided in connection with FIGS. 4-10 and described below. The buffer classification system, generally indicated by the number 200 in the following description may be implemented on any of the various networks. Moreover, as discussed more completely below, system 200 may be instantiated as a network device within such networks or a virtual network function on a network.

Figure 1A:
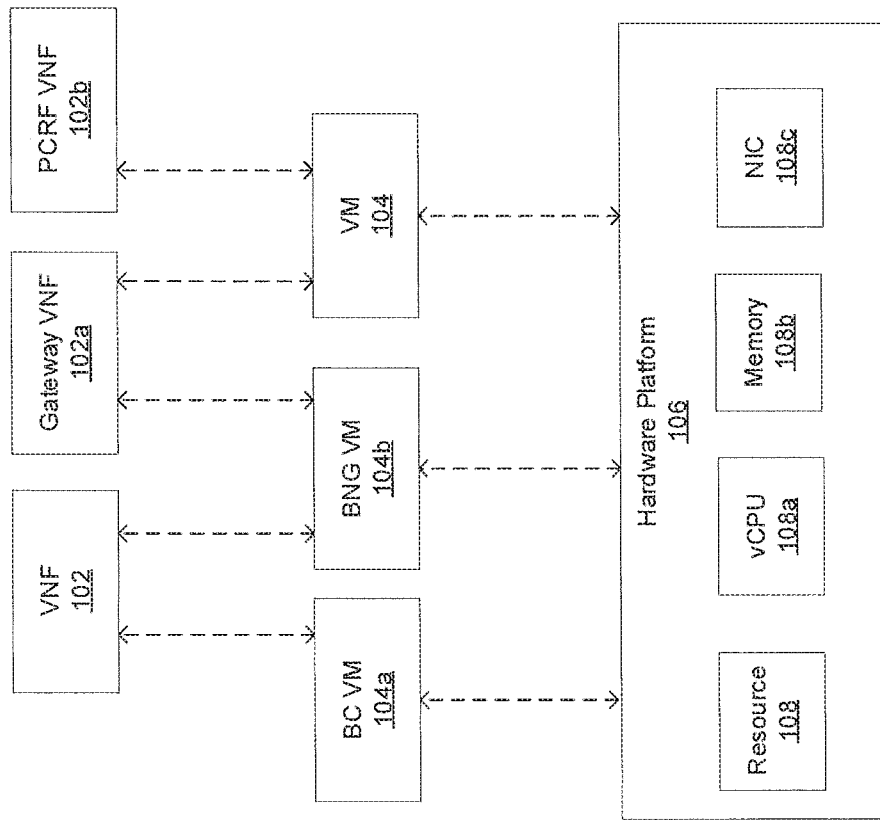
FIG. 1A is a representation of an exemplary network.

FIG. 1A is a representation of an exemplary network 100. Network 100 may comprise a software defined network or SDN, for example, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs including but not limited to security, routing, wide area network (WAN) optimization and others within a service providers virtual network offerings. According to the example, VNF 102 may estimate a buffer condition as described more completely below.

Each VNF 102 may use one or more virtual machine (VM) 104 to operate. Each VM 104 may have a VM type that indicates its functionality or role. For example, FIG. 1A illustrates a buffer classifier (BC) VM 104a and a broadband network gateway (BNG) VM 104b. Additionally or alternatively, VM 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
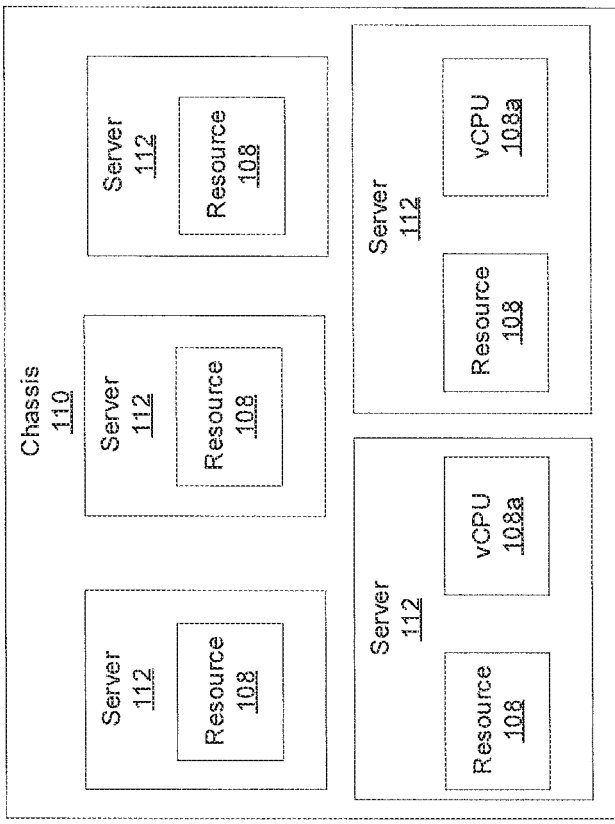
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
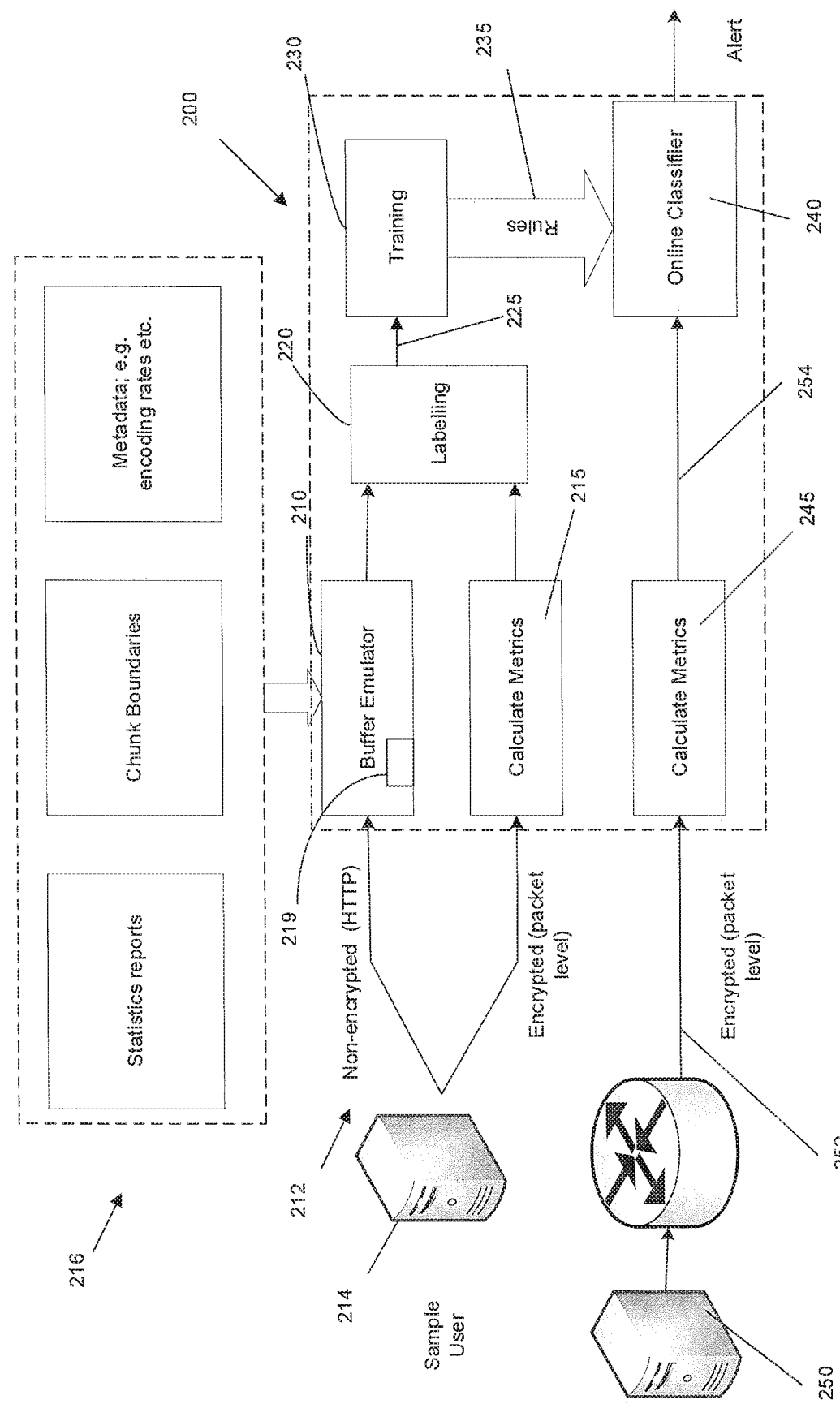
FIG. 2 is a representation of a buffer classification system according to an example.

With reference to FIG. 2, a buffer classification system is generally indicated by the number 200. System 200 generally includes a buffer emulation module or emulator 210. Buffer emulator 210 is used for automated labeling of a sample set of flows indicated at 212. To extract HTTP information, the buffer emulation module 210 relies on a trusted proxy 214. Buffer emulation module registers stream data generally indicated at 216 including but not limited to application layer information, statistics reports, chunk boundaries, and encoding rates or other information typically contained in meta-data files including but not limited to bit rate, frame rate, and resolution.

Using the trusted proxy 214, buffer emulator 210 emulates a player at a selected location within the network based on where the proxy is placed. For example, to emulate a player on a client device, emulator behaves as if it were sitting at the network interface card (NIC) of the client device. In this example, emulator 210 registers available HTTP-level, TCP/IP-level and stream meta-data. Buffer emulator 210 may operate based on events and track current states including buffering, playing, or stalling, and a next event that changes the players state such as chunk download completion or buffer dropping to zero causing a stall.

In a HAS playback session, the client typically downloads video from one CDN server. With HAS services, each video quality encoding is typically split into smaller chunks with unique URLs that can be independently downloaded and played, allowing for efficient quality adaptation.

When a client initiates playback, a manifest file is first downloaded that contains information about the different encodings at which the video is available. As common with many services, the client also obtains additional meta information about the encodings and mappings between chunk byte offsets and their corresponding playtimes. This information is then used by the adaptive algorithms to make range-requests that typically map to one to six chunks (i.e., 5-30 seconds of data) at a time. Although the client receives this data linearly, in reality the player requires a minimum amount of information before frames can be decoded. In one example, emulator 210 assumes that a chunk must be fully downloaded before playback of that chunk.

Buffer emulator 210 may include a proxy companion tool 219, such as for example, a mitmdump tool, to extract information about the communication sequences including but not limited to request initiation times, range requests, their encoding rates, and the port number over which these requests were delivered. In the example, buffer emulator 210 obtains download completion times of range requests and the individual chunks that make up each range request by extracting chunk byte boundaries from the meta-data corresponding to each encoding and counting successfully delivered in order payload bytes using the packet traces. In other examples, proxy companion tool may also capture download completion times.

System 200 may also include a first metrics calculator 215 that is also connected to the trusted proxy 214 for a sample user. First metrics calculator 215 receives packet level data, which may be encrypted as shown. Metrics calculator 215 calculates summary metrics on the packet level data and passes the metrics to a learning module 220, described more completely below. By simultaneously calculating summary metrics on the corresponding packet level data, buffer emulator 210 may be used to create labeled training data sets 218.

System 200 further includes a learning module 220 and a training module 230. Each module described herein may be instantiated as a standalone module or incorporated with one or more of the other modules. Learning module 220 receives buffer emulation data and calculated metrics from buffer emulation module 210 and first metrics calculator 215. This data is combined and machine learning applied to transmit labeled training data sets 225 to training module 230. According to one example, learning module 220 identifies a true positive in instances where classifier indicates a buffer level below a selected threshold value. A buffer value of zero would indicate a stall. Throughput based classifiers, inter request based classifiers or a combination thereof may be used.

In one example, a throughput based classifier is used. For evaluation, training data used by this classifier was generated by computing the average throughput per second observed over different time windows during playback. By computing average throughput over different time windows, system captures short term bandwidth fluctuations with the smaller windows and long term throughput degradation with larger time windows. Learning module 220 may also receive speed of data (bytes per second) information to observe a bound of quality. For example, a known number of bytes corresponding to a quality level may be used as a threshold. In an inter request based classifier or combination example, techniques could be used to capture trick playback modes (2×, 4×, etc), where the inter request time could be used to estimate a playback rate. Training and evaluation data sets are tagged with stall occurrences based on the emulated buffer.

Learning module 220 may include threshold-based classifiers and basic machine learning classifiers. The classifiers may include testing methods based on decision trees, boosted decision tree, and support vector machines (SVM). Example SVMs include machine learning libraries such as Waffles, LibSVM, and Microsoft Azure Machine Learning Studio. According to one example, decision trees were used in connection with video streams. It will be understood that other machine learning techniques may be used depending on the client or service being classified.

Training module 230 provides classifier rules 235 that may be passed to an online classifier 240, and used to perform real time classification of buffer conditions as described more completely below. Training module 230 works with learning module 220 to establish a ground truth and map to a higher level, for example, estimating buffer conditions from traffic. Training module observes traffic from trusted proxy 214 and defines rules to label traffic. Trusted proxy 214 may be a third party reference device using a client. In a threshold classifier process, training module 220 may use VMOS for video quality based rules. In other examples, annotated video may be used to establish rules. QoE rules may look to start up delay, stalls and rebuffering ratio information to determine quality of delivery weighting for the rules. VMOS values including but not limited to full reference metric frame by frame comparisons or frame rate information may be used to establish picture quality weighting.

A second metrics calculator 245 is connected to online classifier 240 and receives packet level data from a user terminal 250. The second metrics calculator 245 pulls packet level data from a flow 252 between user 250 and a client server 255 (FIG. 2A), and transmits the metrics 254 to online classifier 240. Online classifier 240 maps the metrics obtained from the network to the rules 235 developed from the trusted proxy 214 to classify flows. The classification may be performed in real time to classify the flow 252. In one example, the online classifier 240 may map a flow 252 to a low, medium or high buffer condition to assess the buffer QoE. Classifier 240 may save a report of the flows classified in memory and compare flow classifications for a variety of clients. This information may be reported to or accessed by a network operator to evaluate the QoE within the network 100, as described below. Alternatively, when online classifier 240 detects a low buffer condition or other buffer condition that is viewed as negatively impacting QoE, it may provide an alert A. The alert A may be communicated to the user device, network operator work station, client device or other device. The alert A may provide notice of a low buffer condition or other condition giving rise to the alert or alert A may provide additional information.

Playback stalls are the key indicators of user satisfaction and significantly impact video abandonment. Since stalls typically occur due to empty playback buffers, capturing the buffer occupancy of clients is therefore important when trying to understand clients' playback experience. Identification of clients with low buffer conditions can also be used to improve users' QoE. For example, at a coarse time granularity, a network operator can use knowledge about overall streaming quality when performing capacity planning. At finer time granularity, per-session knowledge or per-client knowledge at a minute granularity, can be used to perform offloading and power management. Finally, at even finer granularity, of a few seconds, for example, clients with low buffer conditions can be optimized to reduce the chance of stalls. With reference to FIG. 2A, one example of a system 200 is shown, where a user terminal 250 is streaming from a client server 255. A metrics calculator 245 in system 200 is in communication with user terminal 250 and receives a data flow 252 as described above. System 200 applies classifier rules developed during training to the flow 252 to assess the buffer condition of the flow 252. If an undesirable buffer condition is predicted when the rules are applied, classifier may generate an alert signal and deliver it to a network operator work station 260. When an alert is received, according to one example, network operator 260 may change the priority level of the transmission to mitigate or avoid an undesirable buffer condition. For example, video streams are typically provided general data priority for network communications. When a low buffer condition exists, network operator 260 may assign a higher priority to increase the bandwidth for the transmission and decrease the likelihood of a stall or other event that would degrade QoE. Alternatively, network operator 260 may take other actions including but not limited to providing more capacity, throttling a flow to avoid buffer depletion and the like. As schematically shown, network operator work station 260 may send a command, generally indicated at 265, to implement such action.

Figure 2B:
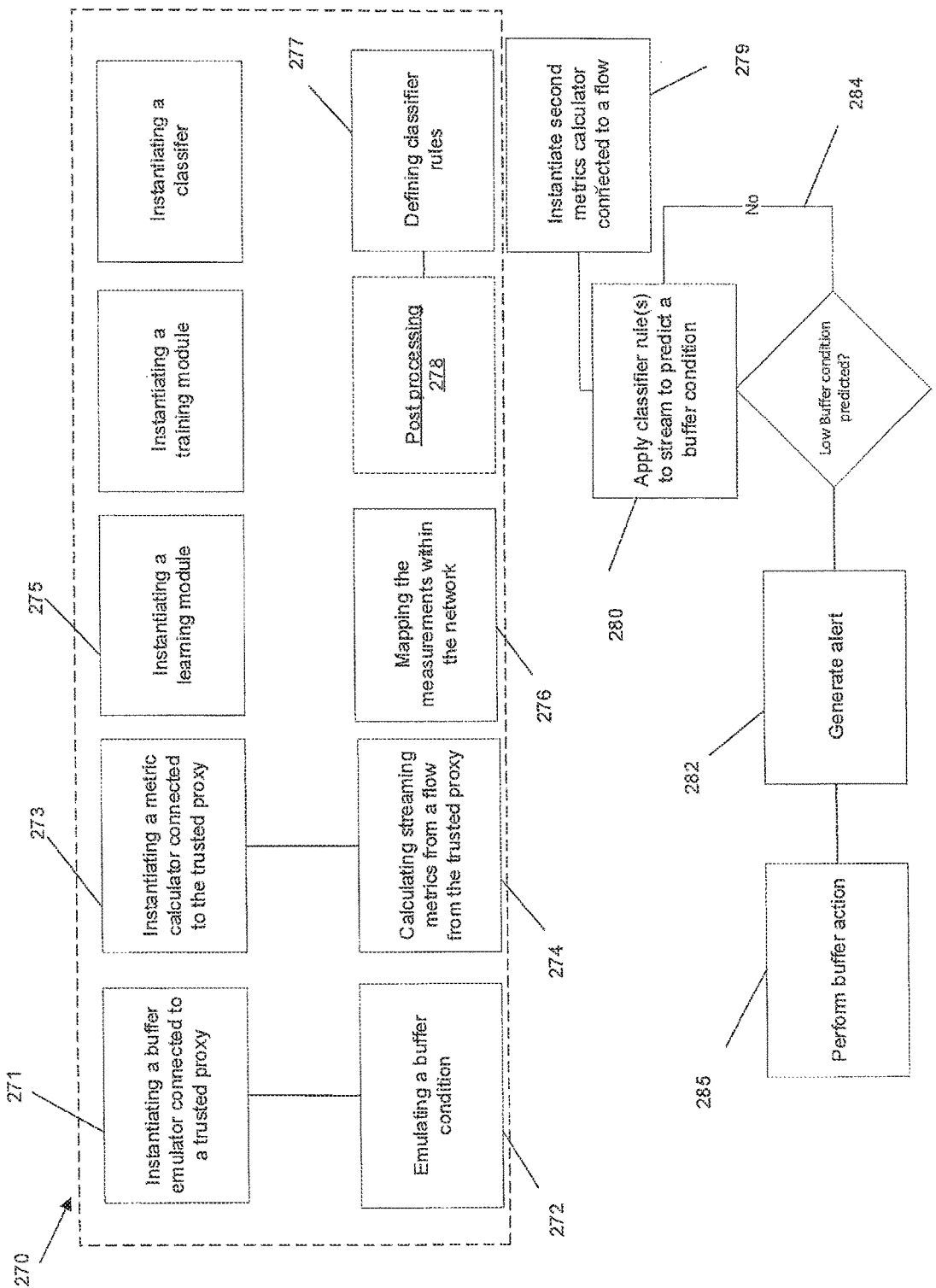
FIG. 2B flow diagram depicting operations of a buffer classification system according to an example.

With reference to FIGS. 2 and 2B, system 200 generally performs classification operations, generally indicated at 270, including instantiating a buffer emulator 210 at 271, connecting the buffer emulator 210 to a trusted proxy 214 to emulate a buffer during a stream at 272. The system 200 further instantiates a first metrics calculator 215 and connects it to trusted proxy at 273. The first metrics calculator 215 calculates streaming metrics at 274 from a flow from the trusted proxy 214. The system 200 instantiates a learning module 220 at 275. Learning module 220 is connected to the buffer emulator 210 and first metrics calculator 215. The learning module 220 is connected to a training module 230. The learning module 220 takes the information from the buffer emulator 210 and metrics calculator 215 and maps these measurements within the network 100 at step 276. The system 200 determines at least one classifier rule that mapped to the metrics at 277. Optionally, learning module 220 may perform post-processing at 278 to look at start up delay, stalls and VMOS metrics to further refine the classifier rules.

A second metrics calculator 240 is instantiated at 279 and connected to a user terminal flow 252 and applies the at least one classifier rule at 280 to predict a buffer condition of a data stream between the user terminal and a client server. The flow 252 may be analyzed in real time. If a low buffer condition is predicted by application of the classifier rule(s), system 200 generates an alert to network workstation at 282. If no low buffer condition is predicted, the system continues to apply the classifier rules until the stream successfully concludes at 284. When an alert is generated, the network workstation may take a network action to reduce the likelihood or effects of the low buffer condition at 285.

Figure 3:
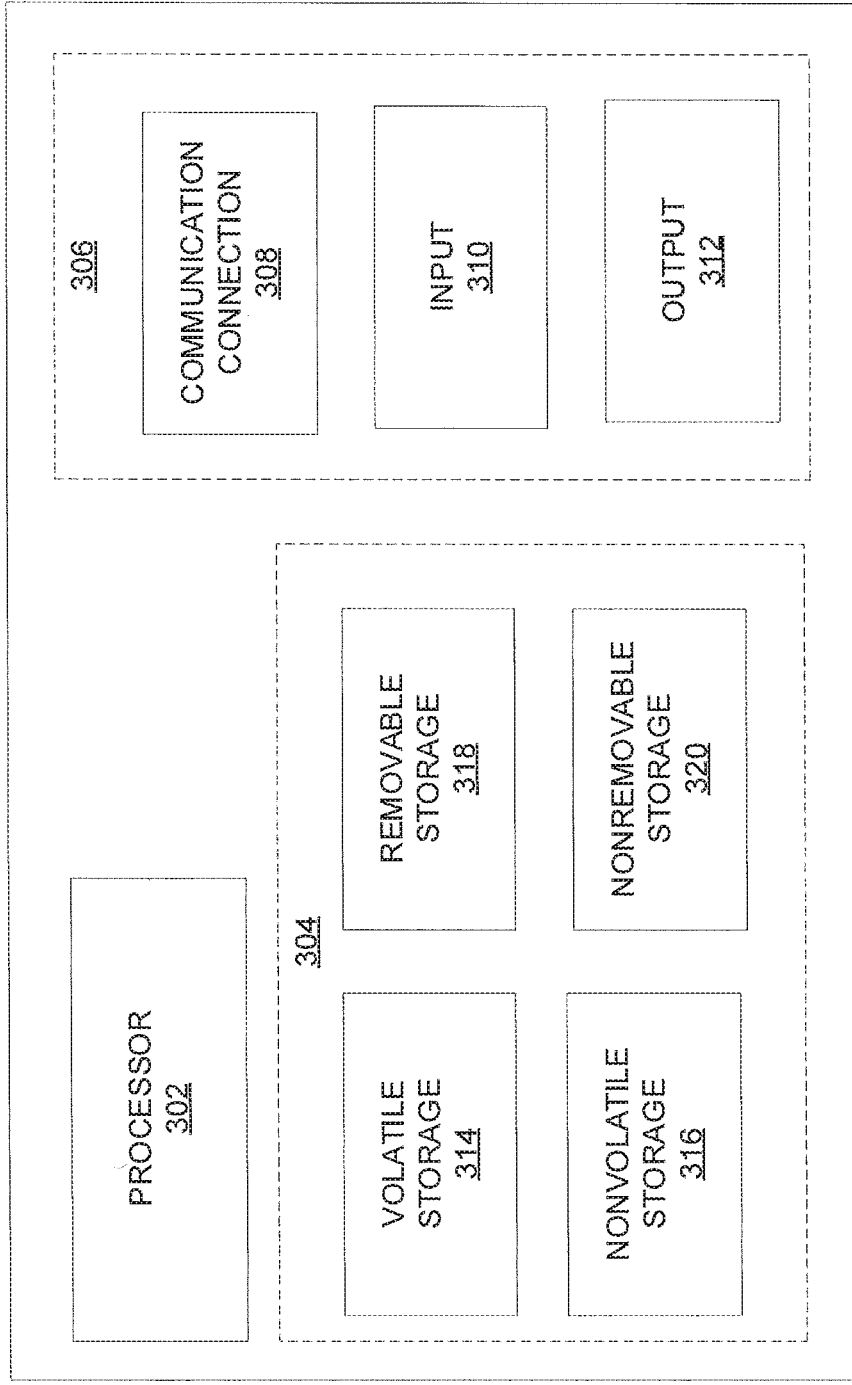
FIG. 3 is a representation of a network device according to an example.

As referenced above, quality of service system 200 may be implemented in a network device. FIG. 3 illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with building and onboarding at least one VNF as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to change QOS on demand as described above.

Figure 4:
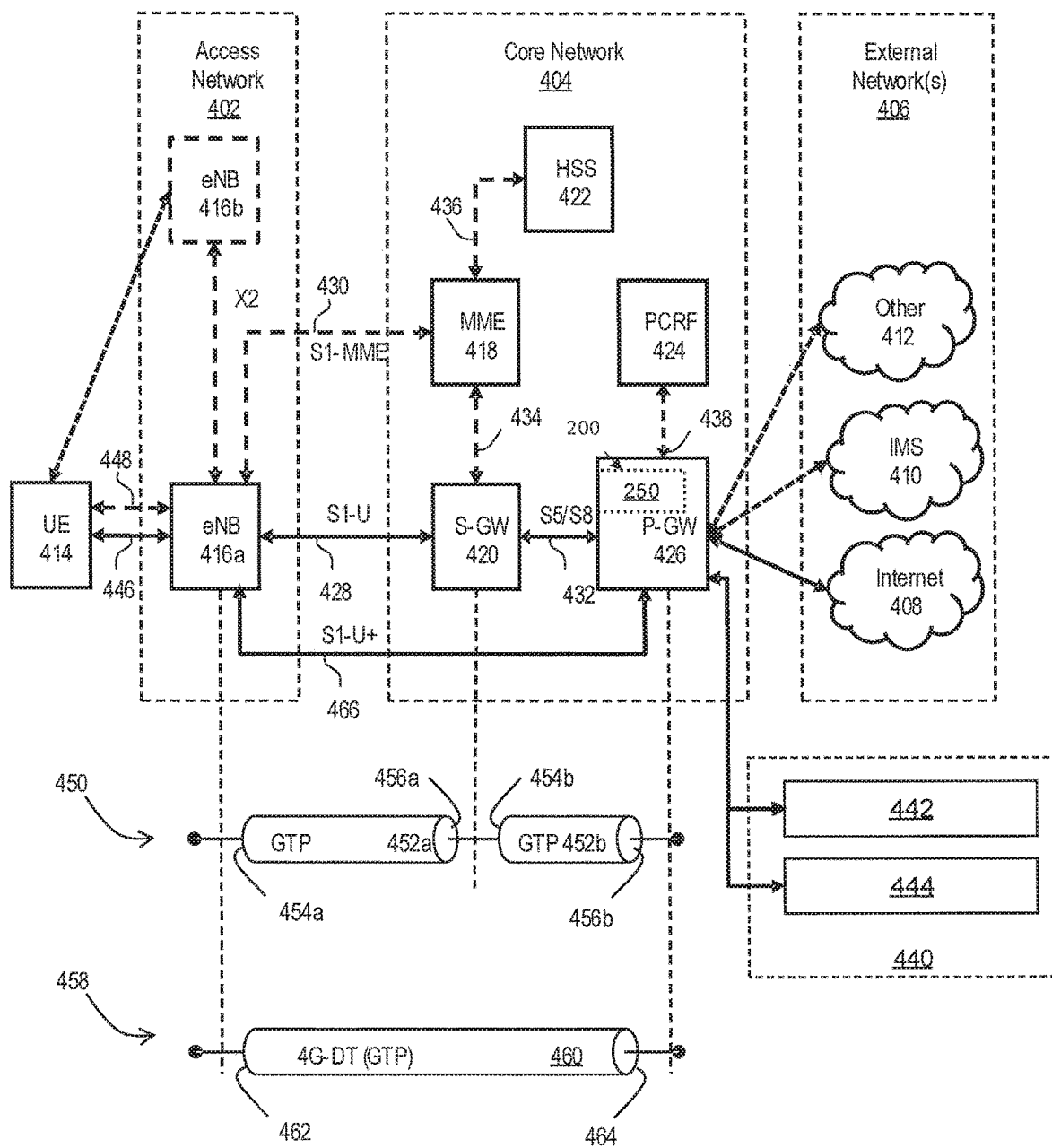
FIG. 4 depicts an exemplary communication system that provides wireless telecommunication services over wireless communication networks that may be at least partially implemented as an SDN.

As discussed previously, a quality of service system 200 QOS controller 210 may be incorporated in an SDN 100. SDN 100 may be implemented in or communicate with a variety of network architectures. Example architectures will now be described with reference to FIGS. 4-10. These examples should not be considered limiting. FIG. 4 illustrates a functional block diagram depicting one example of an LTE-EPS network architecture 400 that may be at least partially implemented as an SDN 100. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 1B:
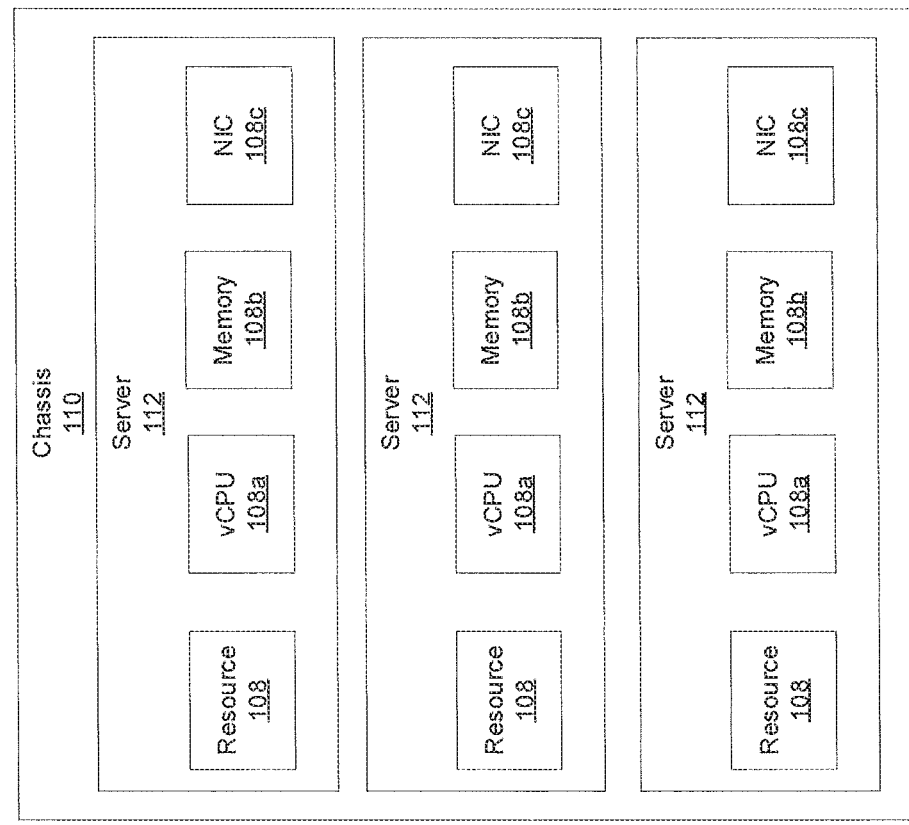
Figure 5:
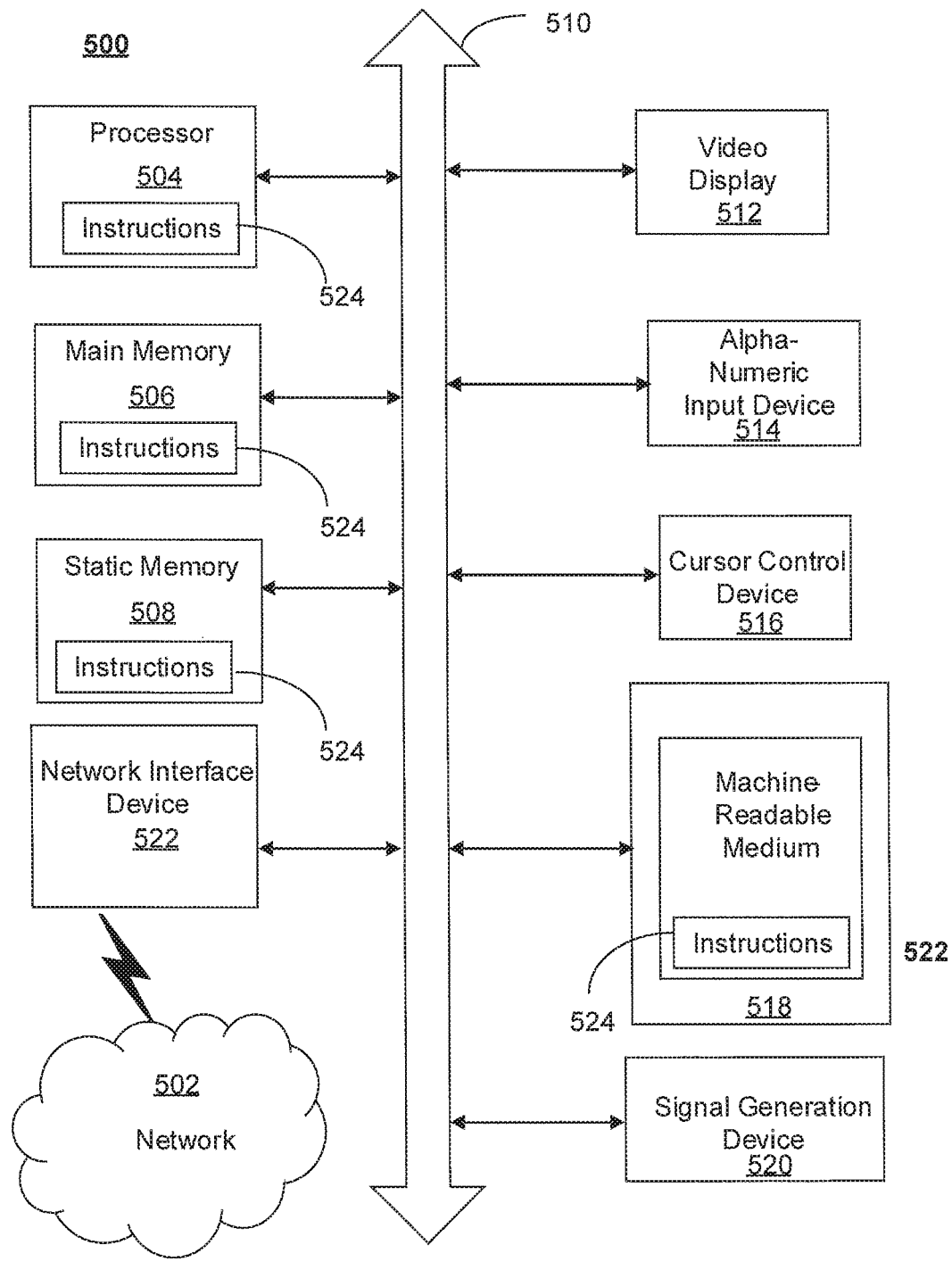
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
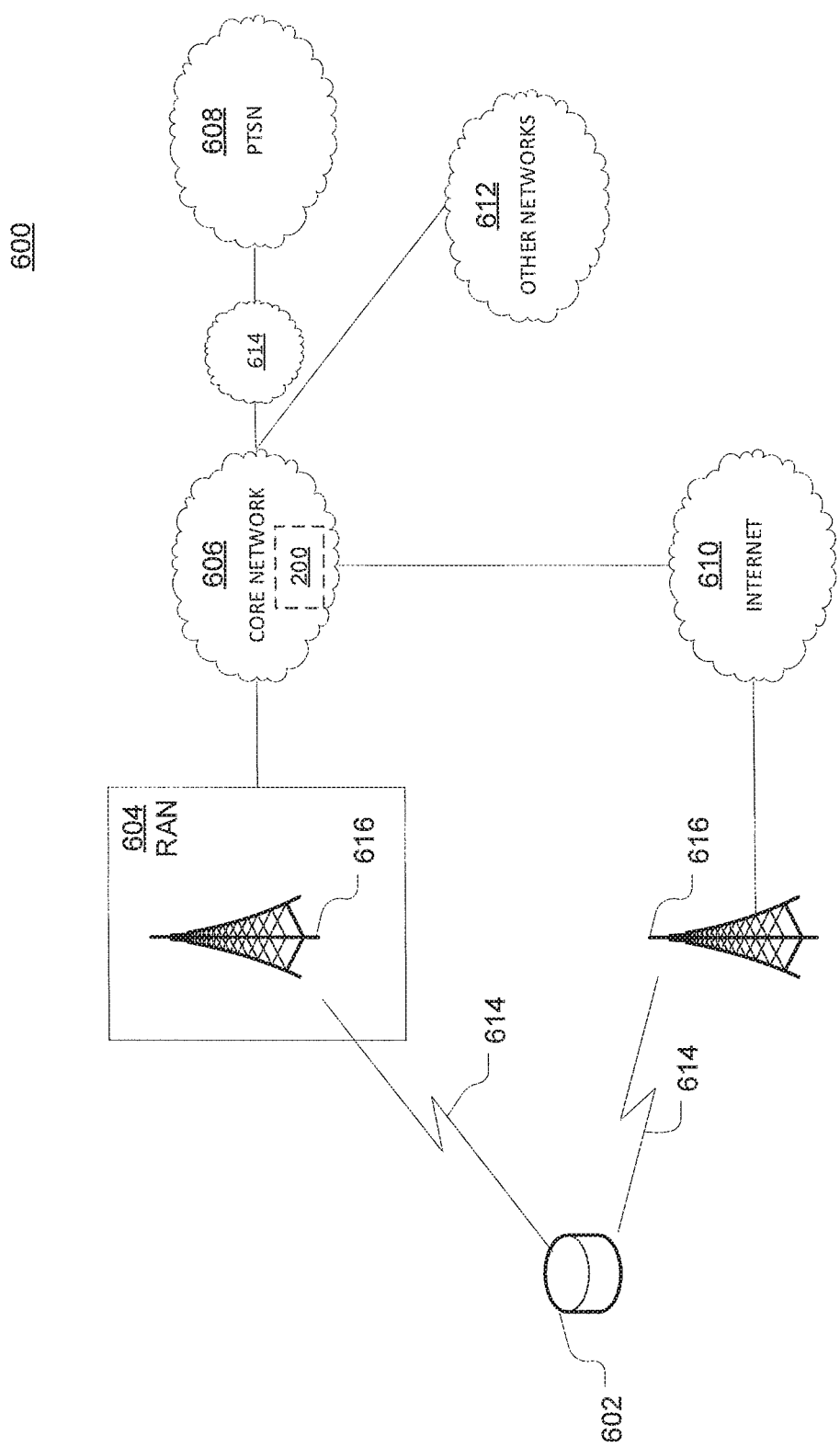
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements, such as a base station controller (BSC), a radio network controller (RNC), or relay nodes. One or more base stations 616 may be configured to transmit or receive wireless signals within a particular geographic region, which may be referred to as a cell. The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
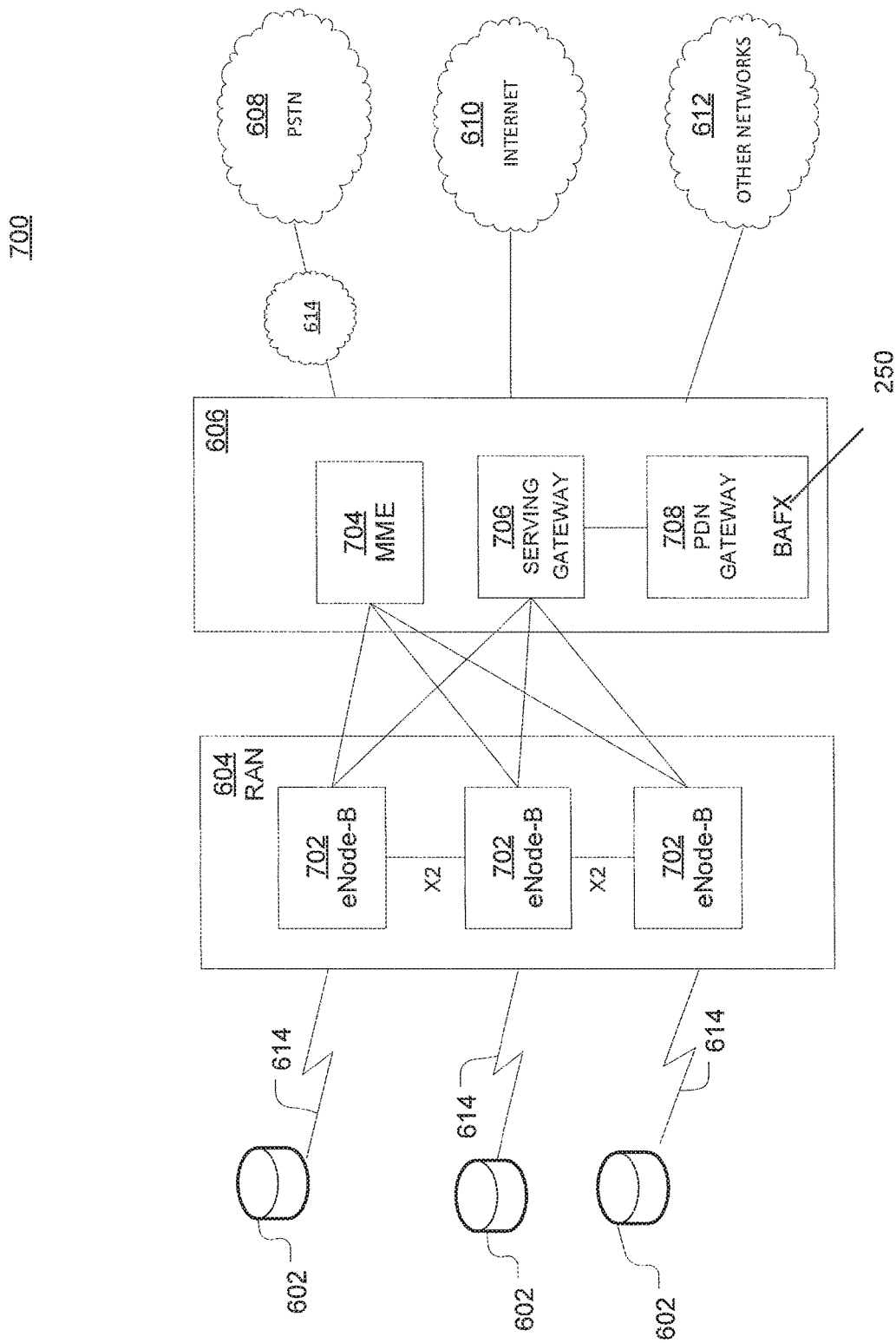
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
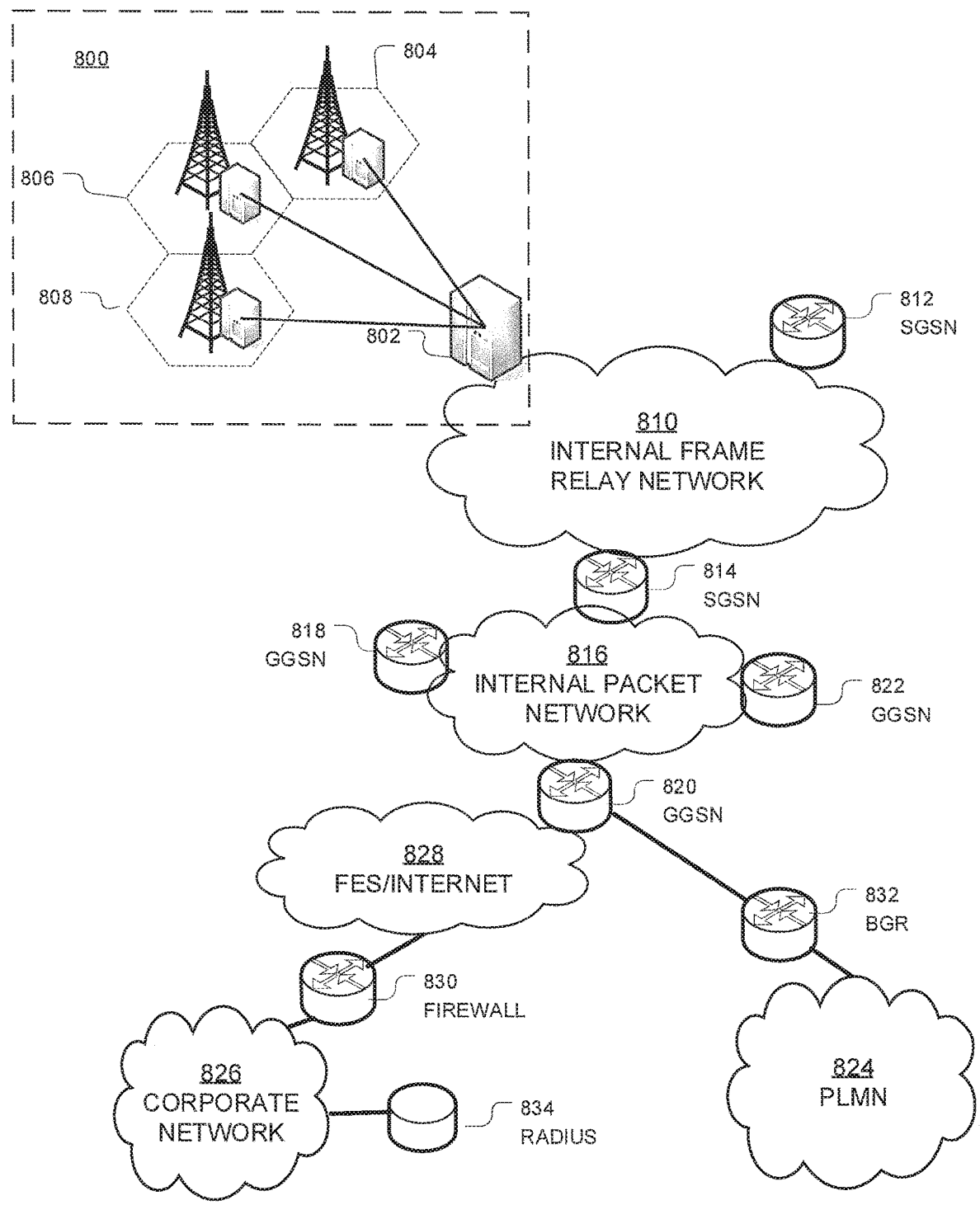
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average rooftop level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
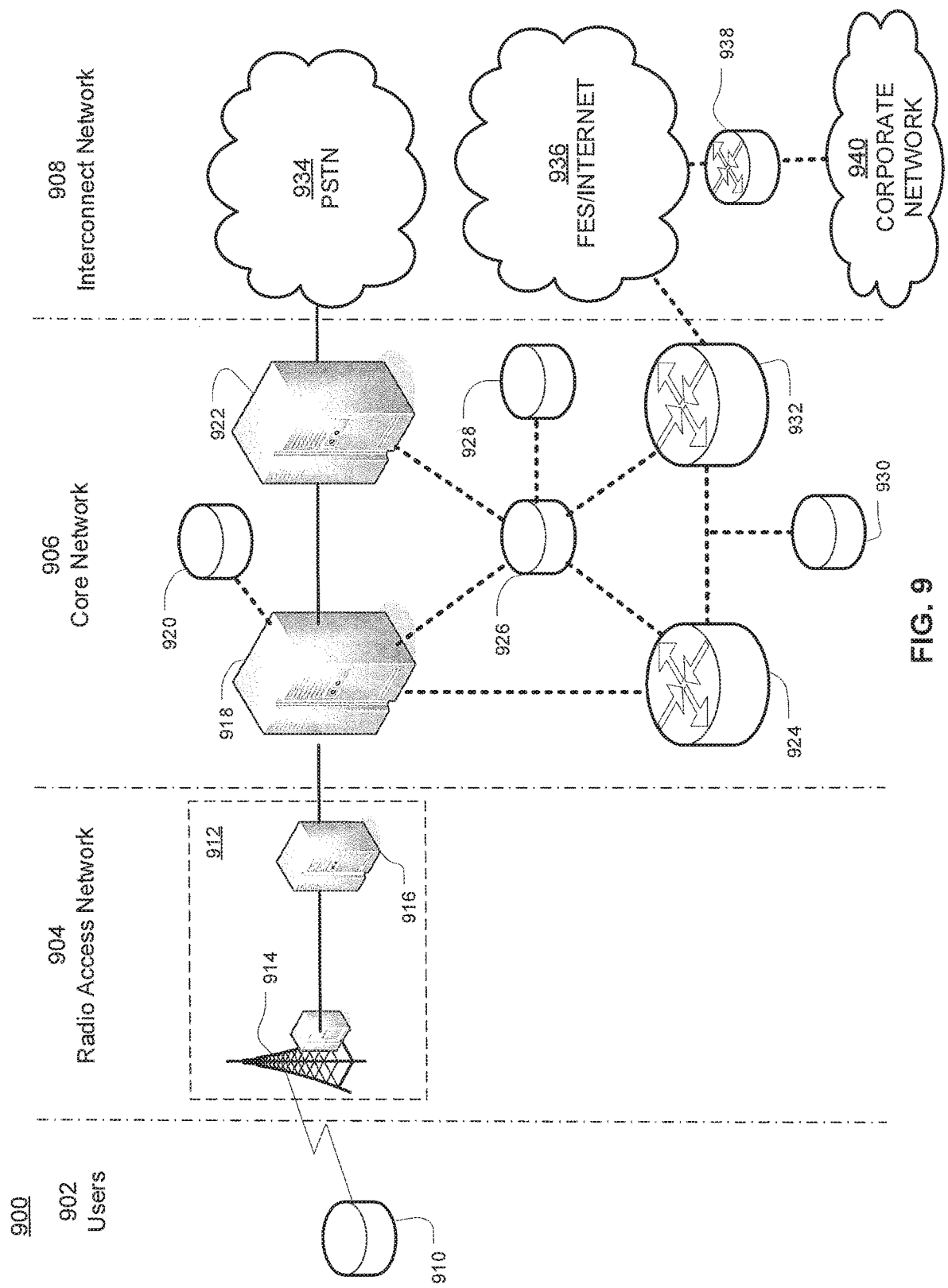
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
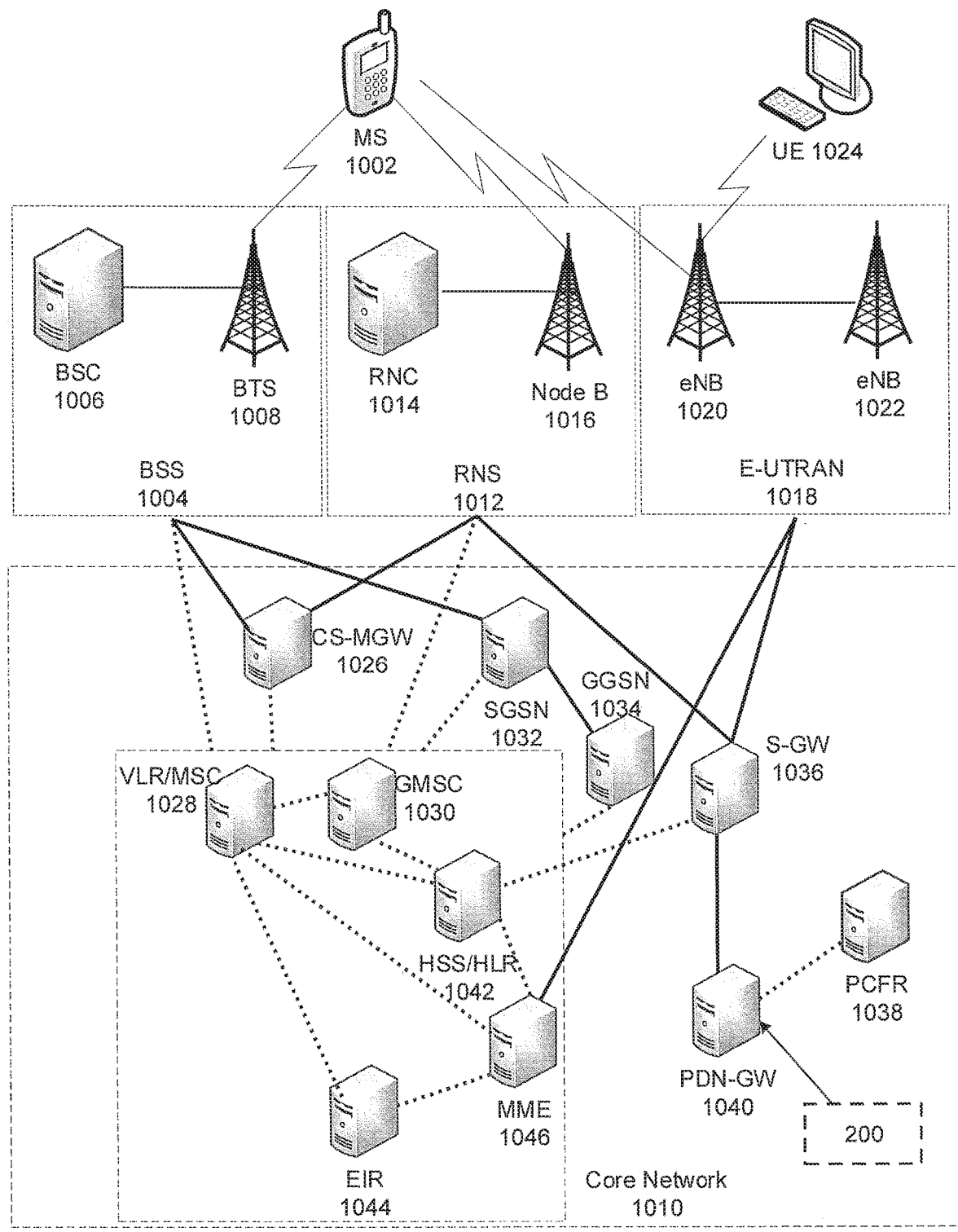
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a buffer classification system in which streaming can be processed and managed have been described in connection with various computing devices/ processors, the underlying concepts may be applied to any computing device, processor, or system capable of facilitating classification of buffering events during streaming. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

Experiment

A system according to one example was tested under experimental conditions. In particular, the system was tested to classify buffering conditions in connection with a YouTube® stream. Streaming techniques used in YouTube are generally consistent with other HAS services. During a playback session, the client typically downloads video from one CDN server. In addition, YouTube clients typically communicate with a statistics server that collects client-side playback statistics and also with various advertisement servers.

YouTube supports playback in both Flash and HTML5 containers, with both video and audio streams generally being available in many formats, including fly, mp4 and WebM. With HTML5 being the expected industry standard for Web streaming, we report experiments using HTML5 enabled clients that use WebM encoded videos.

With HAS services, each video quality encoding is typically split into smaller chunks with unique URLs that can be independently downloaded and played, allowing for efficient quality adaptation. With YouTube, however, each encoding of the video is given a separate identifier and range requests are instead used to download chunk sequences. As a result, a single request can be used to request multiple chunks at a time avoiding unnecessary on-off periods, for example, that may otherwise hurt client performance.

When a client initiates playback, a manifest file is first downloaded that contains information about the different encodings at which the video is available. As common with many services, the client also obtains additional meta information about the encodings and mappings between chunk byte offsets and their corresponding playtimes. This information is then used by the adaptive algorithms to make range-requests that typically map to one to six chunks (i.e., 5-30 seconds of data) at a time. Although the client receives this data linearly, in reality the player requires a minimum amount of information before frames can be decoded. In the tested emulator, it is assumed that a chunk must be fully downloaded before playback of that chunk.

According to the examples, the system includes an event-driven buffer emulation module that emulates the buffer conditions over entire playback sessions using HTTP and meta-data information extracted using a trusted proxy design.

An experimental testbed using a trusted proxy splits the HTTPS end-to-end connection. On the client side, the browser traffic goes through mitmproxy (v0.13). The proxy logs the application-level information for each HTTP request and response in clear text, before forwarding the unmodified (encrypted) requests/response to/from the server. Simultaneously, TCP/IP packet-level information is collected. In addition, for each streaming session, the manifest file for each video, as well as the meta-data that contains chunk boundaries for each video quality encoding is downloaded.

For each video session, the mitmdump proxy companion tool is used to extract information about the communication sequences. In particular, for the main video stream, the tool extracts information about request initiation times, range requests, their encoding rates, and the port numbers over which these requests were delivered.

Due to limitations of mitmproxy v0.13, the proxy logs do not capture download completion times. To obtain the download completion times of range requests and the individual chunks that make up each range request, buffer emulation module extracts chunk byte boundaries from the meta-data corresponding to each encoding (described next), and then count successfully delivered in-order payload bytes using the packet traces.

Due to variable bit-rate encoding, chunk sizes can vary significantly even within a specific video quality profile. To extract and identify chunk byte boundaries within a given video quality encoding file and range request, youtubed1 is used. The chunk boundaries are then associated with code-clevel meta data to compute the mapping between playtime and bytes along the video. The mkvinfo tool is used to parse the meta information and to extract the location, playtime, and position in the video byte stream of every key frame.

To optimize the system for the YouTube application, in addition to the information about chunk transfers, the system also extracts information about all statistical reports, sent as separate HTTP requests to YouTube's statistics servers. The client-side information extracted from the URI of these reports include the timestamp of the request, the playpoint at that time, and the elapsed time since beginning playback.

For the case of non-instrumented clients, we note that these reports can be used as a type of ground truth for when stalls occurred, but also to estimate when playback was resumed on the client. In this experiment, the statistical reports were used to (i) align the emulator's playback point with that of the emulations of the proprietary player, and (ii) as a type of ground truth in evaluating when playback was initiated and stalls took place. For the ground truth evaluations, we say that a stall has occurred between two statistical reports if there is a change in the relative time difference between the current video playtime and the time elapsed since beginning playback. The total change between these metrics is used to estimate the total stall duration of such events. It is, however, important to note that the frequency of statistical reports typically is only once every 20-30 seconds, and they therefore only provide limited time granularity.

It is understood that YouTube re-downloads chunks, that have previously been downloaded at a different quality, when the bandwidth estimate suggests that a higher encoding is sustainable. The buffer emulation module can identify such requests and computes the buffer size accordingly. The buffer emulation module in the experiment captures data seen at the client's network interface card (NIC). The buffer emulation module tracks the current state of the client (i.e. buffering, playing, or stalled) and the next event that can change the player's state including chunk download completions and buffer dropping to zero. To allow for post processing of the player dynamics, the system records logs with all emulated events and player states. In a first test, playing a video from start to finish was analyzed. In other tests, on-demand features including fast-forward, rewind, and pause were included. In the latter cases, gaps in chunks downloaded were deemed to indicate that the player had moved to a new playback position. Pause operations were treated conservatively with the buffer emulation module continuing to drain the estimated buffer.

Figure 18B:
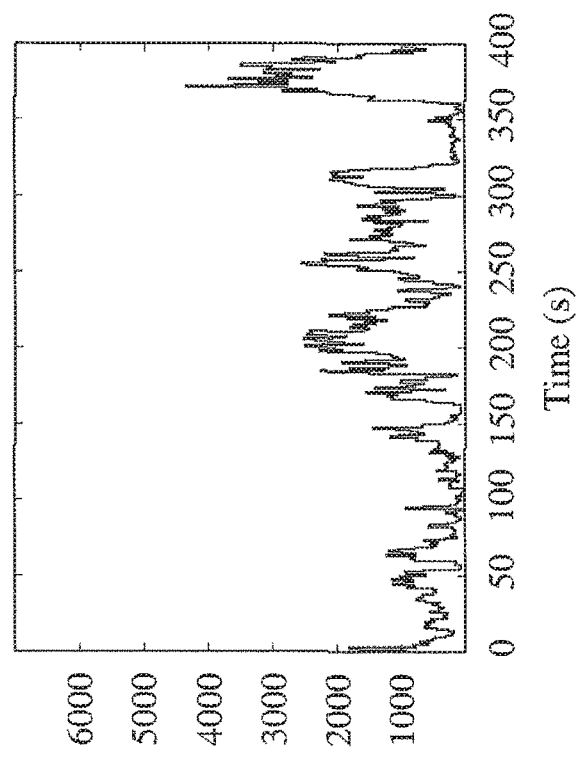
FIG. 18B is a plot of a real bandwidth trace.
Figure 18A:
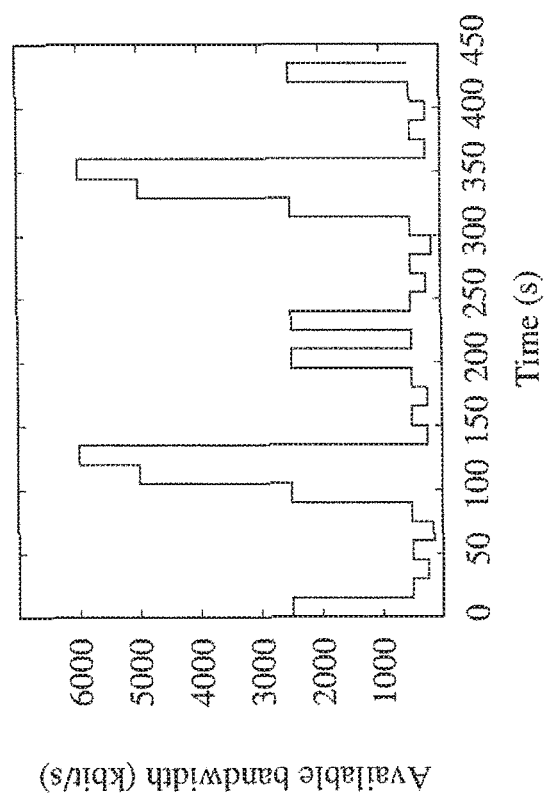
FIG. 18A is plot of a synthetic bandwidth trace.

In the test, five synthetic and five real-world bandwidth traces were obtained from a 3G network (ex. FIGS. 18A and B). To provide diverse and challenging conditions, these traces were used with 50 YouTube videos including various categories such as news/TV shows, music videos, professional user generated content, homemade user generated content, games/sports, and short movies/animations. The videos were 4-8 minutes long with an average playtime of 347 seconds. All videos were played to full duration. FIG. 18 shows two traces. The following table summarizes the statistics for the bandwidth traces.

TABLE 1

Summary of bandwidth traces.

| Trace | Throughput (kbits/s) | | | | Duration (seconds) |
| --- | --- | --- | --- | --- | --- |
| | Min | Max | Mean | Std | |
| Synthetic High | 300 | 12,000 | 2,986 | 3,578 | 450 |
| Synthetic low 1 | 150 | 6,000 | 1,493 | 1,789 | 450 |
| Synthetic low 2 | 100 | 5,000 | 1,426 | 1,606, | 450 |
| Synthetic low 3 | 150 | 6,000 | 1,493 | 1,789 | 450 |
| Synthetic low 4 | 100 | 5,000 | 1,369 | 1,668 | 450 |
| Synthetic low 5 | 150 | 6,000 | 1,493 | 1,789 | 450 |
| Real (ferry 1) | 22 | 3,185 | 1,353 | 733 | 400 |
| Real (ferry 2) | 114 | 3,594 | 1,376 | 776 | 400 |
| Real (tram 1) | 11 | 4,354 | 915 | 806 | 400 |
| Real (tram 2) | 11 | 2,999 | 983 | 578 | 400 |
| Real (tram 3) | 11 | 2,003 | 609 | 367 | 400 |
| Real (Bus) | 0 | 5,751 | 1,1797 | 864 | 700 |

To validate the event-based emulation module, YouTube's JavaScript API was used to access parameters internal to the player and build a ground truth of the buffer conditions seen in the player. Each video was embedded in a webage and a JavaScript code added to log detailed client-level information. The player was also instrumented to make per-second logging of the Unix time, buffer occupancy, current play point, playback quality, and true player state (i.e., if buffering, playing, or stalling). The simultaneous logging of HTTP and packet-level traces of the playback sessions (using proxy-based measurement framework) permits emulation and comparison of buffer levels and playback states obtained by system 200 with those observed on the player. The comparison was limited to videos that permitted playback with API-level access. The test used a Google Chrome browser with a proxy running on a client machine with Linux Mint version 17 with Linux kernel 3.13.0-24 equipped with a Gigabit Ethernet interface, Intel i7 CPU, and 8 GM of RAM. The device is connected to a LAN, which provides high-speed Internet, and using a dummynet to control the available bandwidth at a per-second granularity. Due to the prevalence of CDNs, no additional delays were added to the RTTs from/to the YouTube edge servers.

Figure 11:
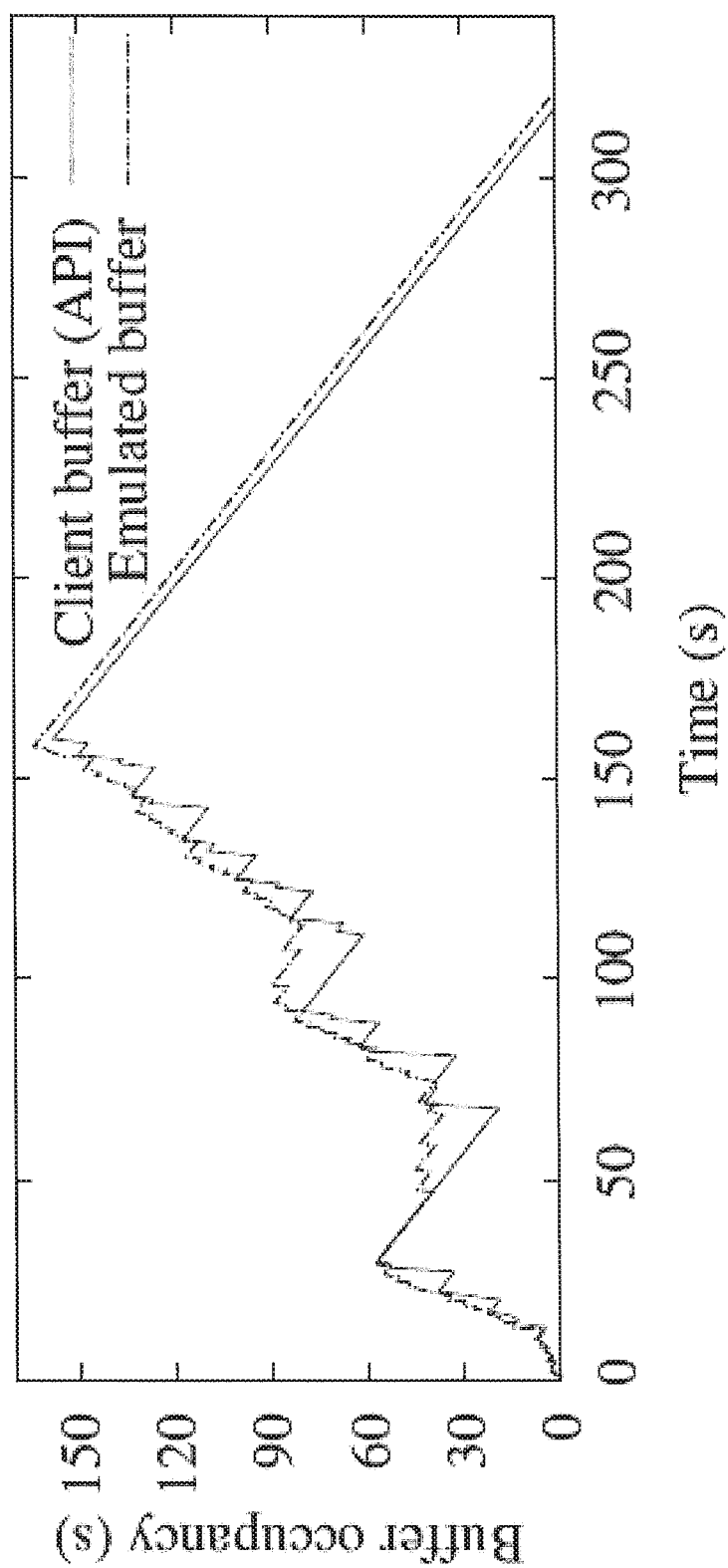
FIG. 11 is a plot comparing a emulated buffer condition according to an example with a client buffer condition.

FIG. 11 shows a comparison between the measured buffer occupancy observed by the API and the emulated buffer (observed at the NIC). In this example, the streaming session included a 6.5 minute long video during which the client had relatively good bandwidth conditions allowing it to download chunks at a relatively high quality for most of the session. The two buffer curves (for the emulated buffer and the actual buffer) nicely follow each other, showing that the emulator captures the general dynamics of the buffer conditions. A closer look at the difference between the two curves shows that the emulated buffer size almost always is slightly larger in this scenario. The reasons for the slightly larger estimates is that the startup instances (which partially can be adjusted for with the help of the statistical reports) are almost the same in this example and the NIC always sees chunks before the player sees them (since the players experience additional operating system related delays, for example). Furthermore, the sharp vertical spikes in the API curves indicate that many chunks are delivered simultaneously to the player, whereas the system's emulation module considers chunks delivered as soon as they are available at the NIC. These observations combined with a relatively accurate startup delay estimation explain why the buffer emulation curve ends up forming an envelope of the actual client buffer in this example scenario.

Figure 12:
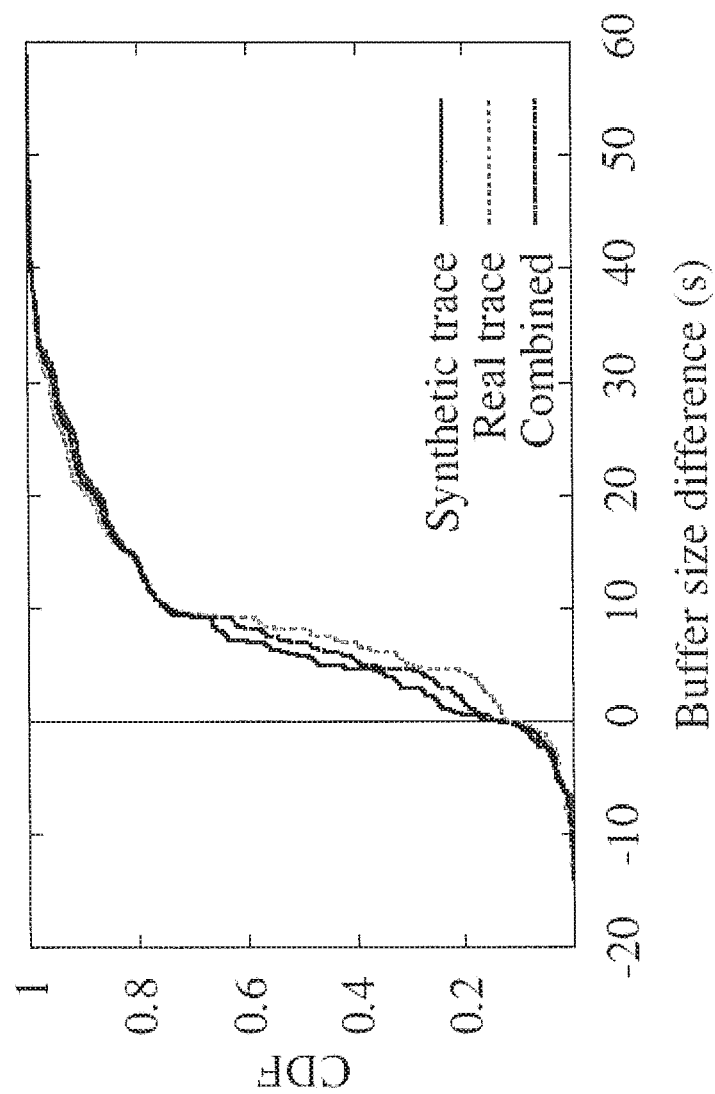
FIG. 12 is a plot comparing CDF over buffer size difference for synthetic, real and combined traces.

Considering the difference in buffer sizes observed at the NIC (using the emulator) and at the player (with the API). FIG. 12 shows the cumulative distribution function (CDF) of the difference between the two buffer sizes, measured at 1 second intervals during playback, over a large number of playback sessions. Here, the system used six bandwidth traces (3 synthetic and 3 real traces) with five different videos per trace.

Most of the observed differences are due to differences in when chunks are seen on the NIC (emulated player) and by the API (real player), as exemplified by the bursty delivery of chunk ranges to the real player (FIG. 11). First, there is a delay between when a chunk is fully downloaded, as seen on the NIC, and when it is available at the player. This is in part due to OS-related delays, caused by having to pass TCP buffers and time varying CPU sharing between competing processes, for example. Clearly, this will cause chunks to be available sooner at the NIC than at the player. Second, a more subtle but noticeable difference occurs due to how and when the player delivers consecutive chunks within a range request. Referring back to FIG. 11, chunks often appear to be delivered to the real player in batches. This is typically (but not always) due to multiple chunks associated with some range requests being delivered in batches, when a subset is fully downloaded. In contrast, the emulator always treats each constituent chunk of a range-request as available for playback as soon as it is fully downloaded. In these cases our emulator is somewhat optimistic in when chunks are obtained/delivered to the player, and should perhaps best be seen as a bound for when chunks are available.

It was observed that while differences due to these factors were not uncommon, the lag caused by the differences was temporary as the player quickly caught up. For example, among the cases with more than 20 seconds difference (with an average difference of 27 seconds), the average difference for this subset (ignoring additionally downloaded chunks at the NIC) reduced to 9.5 seconds after 4 seconds and to 0.69 second after 8 seconds. This suggests that the OS-related delay, even when delivering multiple chunks at once, is less than 8 seconds.

In addition to the differences in when chunks were available to the emulated player (NIC) and the real player (API), the difference in buffer levels observed were also due to how startup instances are estimated and how chunk replacements are handled. In the experiment, the API caps the reported buffer occupancy at the last replaced chunk, even when additional chunks following the replaced chunk were available at a different quality.

Figure 13:
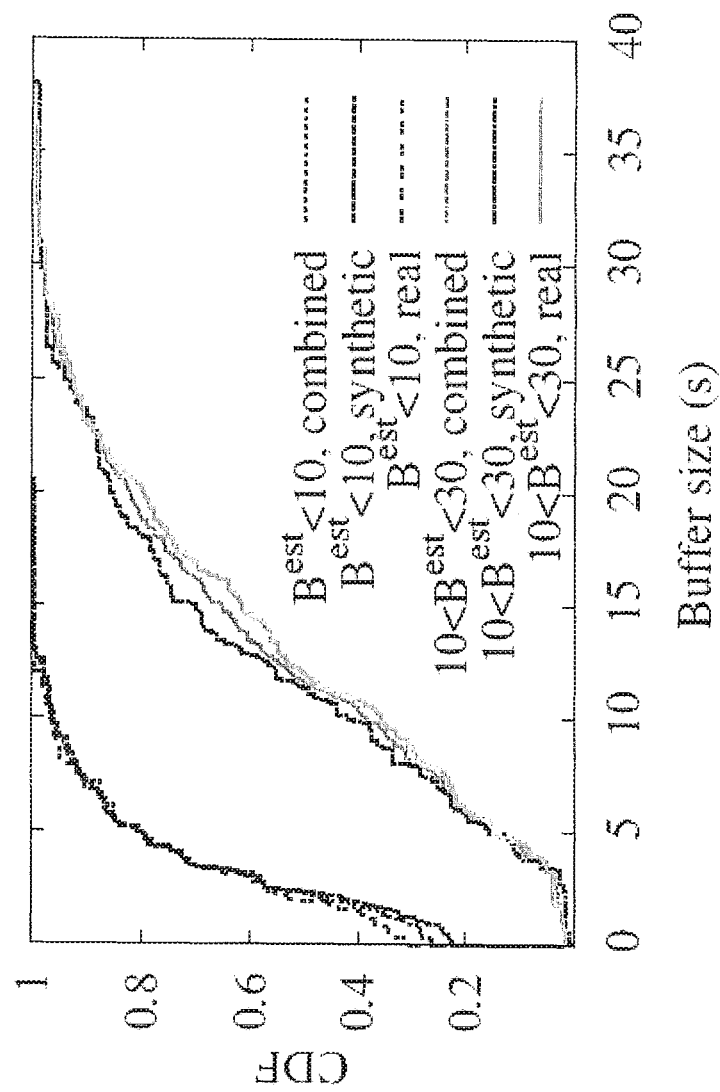
FIG. 13 is a plot comparing synthetic, real, and combined traces for low and medium buffer conditions.

While the OS and player internals in the experiment made it impossible to capture exact buffer conditions using only network data, the system demonstrated that it can distinguish clients with low buffer conditions from clients with intermediate and large buffer conditions. With reference to FIG. 13, actual buffer conditions for clients that the emulator estimated would have low buffer conditions i.e. less than 10 seconds are shown. Clients where emulator estimated a low buffer were less than 10 seconds 98% of the time. These results suggest that the system 200 provides a good estimate for coarse buffer conditions of the player itself despite OS-related delays.

Figure 14B:
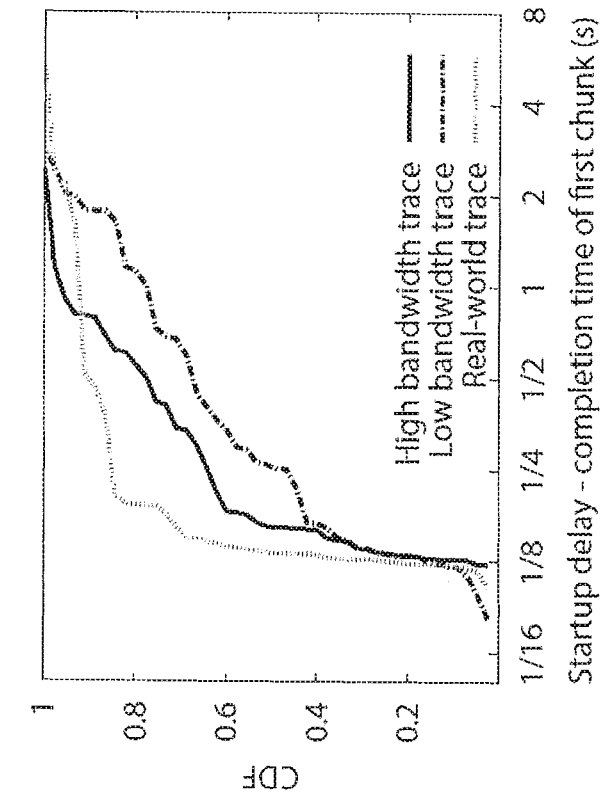
FIG. 14B is a plot of CDF relative to start up delay.
Figure 14A:
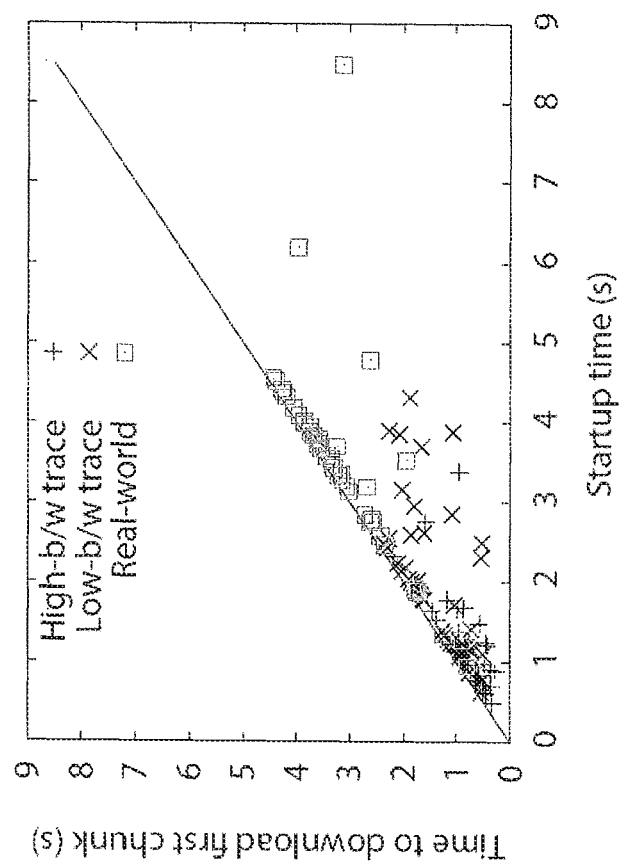
FIG. 14A is a scatter plot of time to download a first chunk over start up time.

The experiment showed that for most streaming sessions, playback begins after the first chunk is downloaded (FIG. 14) shows the CDF between the time between reported startup time and the time that the first chunk is downloaded. In most cases, this difference was between ⅛ and ¼ of a second. This suggested that OS-related delays for the first chunk are typically small.

For a provider side comparison, the accuracy of the NIC based emulator was compared to statistical reports provided by clients. Although these reports did not provide buffer level information, the stall and stall duration metrics provided a useful point for evaluation. Table 2 summarizes accuracy metrics calculated across all stalls observed by the emulator.

TABLE 2

Stall event summary for the emulator.

| Metric | Synthetic low | Synthetic high | Bus trac |
|---|---|---|---|
| Actual stall events | 111 | 6 | 8 |
| Emulated stalls | 107 | 7 | 10 |
| Correct events | 81 | 6 | 6 |
| Videos with stall | 41 | 6 | 5 |
| Videos with emulated stall | 41 | 6 | 8 |
| Videos with correct stall | 41 | 6 | 5 |
| Videos with correct first stall | 34 | 6 | 4 |
| Overall false positives | 0.5 | 0.02 | 0.08 |
| Overall sensitivity | 0.81 | 1 | 0.75 |
| Overall specificity | 0.99 | 0.99 | 0.99 |
| Overall precision | 0.75 | 0.85 | 0.6 |
| Overall accuracy | 0.98 | 0.99 | 0.99 |
| Overall F1 score | 0.78 | 0.92 | 0.66 |
| Overall stall duration | 1.09 | 1.16 | 1.4 |

The data in the table corresponds to the same traces and videos described above. The statistical reports are provided on roughly 20-30 second intervals only allowing determination if there has been at least one stall between two reports. The duration of the stall(s) is shown, but the number of stalls is not available.

The interval between two reports was called a stall event if there was a stall between the two reports and consider the emulated stall(s) as "correct" only if the stall(s)(i) occurs between the same two statistical reports as it is observed by YouTube, and (ii) the combined duration of the stall(s) between these two time instances differ by at most 50%. The overall stall duration ratio is calculated as the ratio of the stall duration reported by the emulator and the stall duration observed from the statistical reports.

Even with the restrictive interval definition, the emulator correctly emulates the time and duration for 93 of 125 stall events observed with the use of statistical reports. While it may appear that we have 32 false positives here, looking closer at the data, all these cases too correspond to actual stall events on the player. For these cases, either the timing or the stall duration do not (exactly) match those extracted based on the statistical reports. These differences are primarily due to the coarse granularity with which stalls are identified from the statistical reports (as they only reveal that a stall occurred between two stats reports, not when) combined with the lag between the NIC and the actual player. Similar observations hold for the other traces.

The system also correctly identified all 52 sessions (out of 150 sessions) that contained at least one stall, while only having three false positives. Furthermore, for 44 of the videos the time instance and duration of the first stall was correct. The higher than average detection rate for the first stall (84.6%) compared to across all stall events (66.4%) is positive, since the first stall may be the most important to avoid for user satisfaction purposes.

The higher accuracy can be explained by the initial startup instances being easier to estimate than those after stalls. While the OS-related delays explain most stalls observed on the player that are not captured by the emulator, the test also observed some interesting cases due to partial chunk replacement. In these cases, the client first downloads a sequence of chunks (say chunks 1-7) at a low quality, and then requests a sequence of chunks (say 5-7) at a higher rate, but does not obtain all chunks (e.g., chunk 6) by its playback deadline. In these cases, our emulator assumes that the client always plays at the highest quality for which it has a complete chunk, whereas it appears that the YouTube player in some cases does not fall back to the lower encoding after making a request to replace a set of chunks. This is probably because the player is implemented so that it cannot make use of the lower quality chunks as they may have been flushed from the buffer, for example, and there is overhead associated with switching back to the lower encoding again. As these cases are rare and future players will handle these situations better, the emulator was not modified to match the YouTube player's current behavior.

Any stall that the emulator identified was manually checked to determine if there was in fact a stall on the player. Overall, the results demonstrate that emulating the buffer conditions at the NIC reasonably estimate the buffer conditions and stalls at the player.

An experiment was also performed to validate the effectiveness of the emulator under user interactive operations such as fast-forwards. The experiment applies to any interactive operation (fast-forward, rewind, etc.) leading the player to a play-point that has not been buffered. The emulator tended to discover fast forwards faster than the statistical reports (which we found typically results in 5-30 seconds delay before observing the forward event). The YouTube specific version of the emulator combines the two methods.

Figure 15:
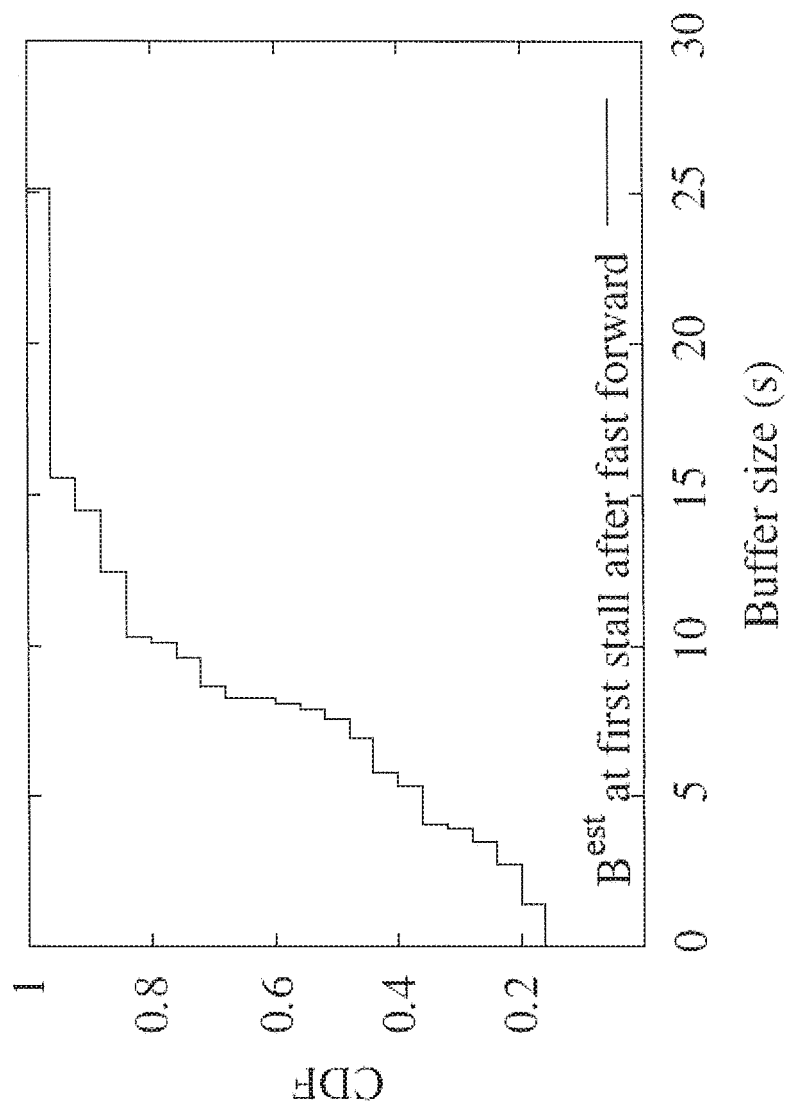
FIG. 15 is a plot of CDF of emulated buffer conditions at the time of a stall.

To illustrate the effectiveness of the approach, we summarize the results of 30 random experiments with both fast forwards and stall events. Out of these, 15 are based on synthetic traces and 15 using real traces. For each experiment, we initially play the video for 60 seconds, after which the playpoint was forwarded a random time-duration beyond the current buffer, causing an out-of-buffer forward. The video is then played until the end and the evaluation looks at the first stall event that occurs after the fast forward. Out of the 30 experiments, 28 contained stalls after the fast forward and the emulator was able to correctly predict the presence of stall in 86% of the 28 cases where there was a stall and did not make any false predictions. However, as before, the emulator in many cases (due to NIC placement) typically is somewhat ahead of the player and often has some data in its (emulated) buffer at the time that the stall occurred. FIG. 15 shows a CDF of the buffer at the emulator at the exact time of these stalls. In 40% of the cases the emulator sees less than one chunk in the buffer and in 84% of the cases it sees less than two chunks in its buffer. Most of the stalls with larger emulated buffer sizes are related to large range request containing multiple chunks.

To prove the calculating module, exponential weighted moving averages (EMWA) for different window weights a for both the per second throughput $X_a$ and the inter request times $I_a$ were continually calculated. Throughput was calculated based on packet payloads delivered from the server to the client, and the inter-request times are estimated as the time between request packets (with payload) from the client to the server. These packets are larger than a regular ACK, and typically contain an HTTP range request to the server.

Figures 16A, 16B:
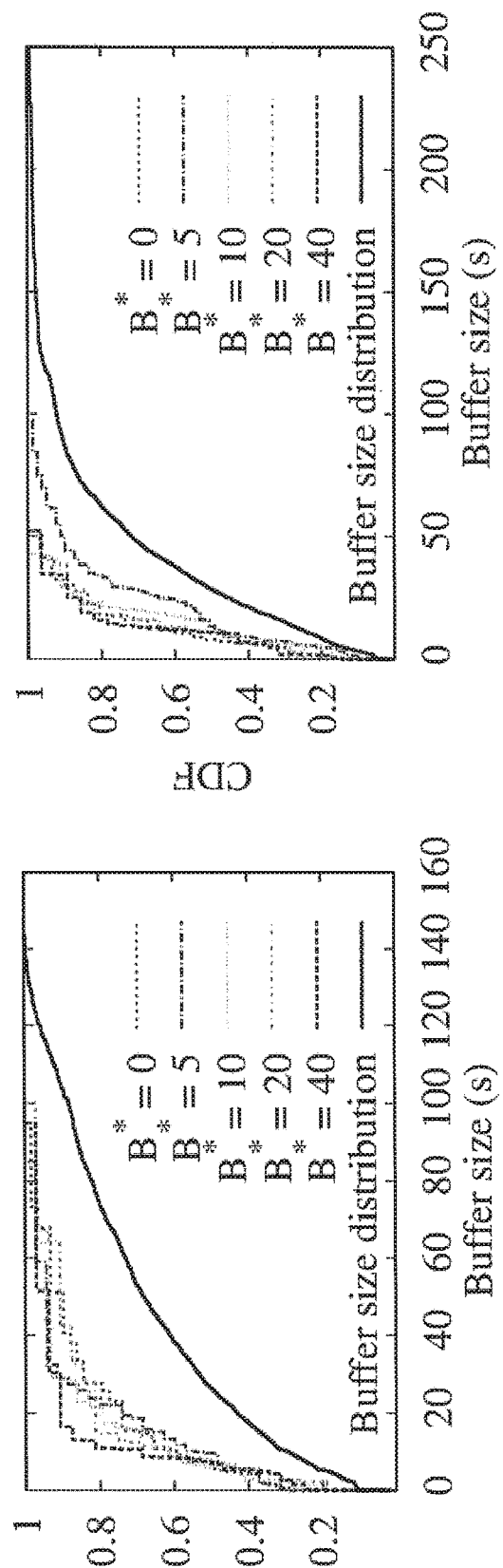
FIG. 16A is a synthetic trace for varying buffer conditions.
FIG. 16B is a real trace for varying buffer conditions

In parallel, the time $X_a$ that the weighted throughput metric has been below a threshold ($X_a$) and the time ($T_a^X$) that the time ($T_a^I$) the weighted inter-arrival time metric $I_a$ was above a threshold $I_a^*$ was calculated. The system's online classifiers made decisions based on these metrics for different window weights and threshold values ($X_a^*$ and $I_a^*$). FIG. 16 shows the CDF of the buffer conditions as seen when the threshold-based online classifiers predicted low buffer conditions and contrasted them to buffer conditions observed over all playback sessions.

Although threshold-based classifiers allow for quick parameter selection and online reconfiguration, their predictive powers are generally considered limited when compared to machine learning techniques. The experiment tested these techniques based on decision trees and Support Vector Machine (SVM) implemented in three popular machine learning packages (Waffles, LibSVM and Microsoft Azure Machine Learning Studio). The results for the two-class boosted decision tree classifier provided the best scores both during training and evaluation.

Boosted decision trees is a class of decision trees that adjusts (boosts) the weights of the trees at the end of every training step based on whether the previous tree classified the data correctly. In our context, the classification problem is based on the decision if a playback stall would occur or not, given the observed throughputs over different time periods. Boosted decision trees are particularly attractive when features are somewhat related (have low entropy)

For the evaluation, the training data used by these classifiers was generated by computing the average throughput per second observed over different time windows during playback. The window sizes that we consider are 5, 10, 20, 40, 80 and 160 seconds. By computing the average throughput over different time-windows, the experiment captured the short-term bandwidth fluctuations with the smaller windows and long-term throughput degradation with the larger time-windows.

As before, both the training and evaluation datasets (different) were tagged with stall occurrences based on the emulated buffer. While these metrics were simple and relatively easy to extract, it should be noted that they are correlated, again motivating the choice of boosted decision trees. The results of the threshold-based classifiers are summarized in Table 3. Here, we show the parameter selection from training (columns 2-4), the F1 score on the training dataset (column 5), and the results on the evaluation dataset (columns 6-8); broken down into sensitivity (column 6), precision (column 7) and F1 scores (column 8). For both the synthetic and real scenarios we show results with B* equal to 0, 5, 10, 20, and 40. In general, a larger B* value provides a larger window for detection. Referring to the parameter selection (columns 2-4), the training framework allowed adjustment of the parameters for each case. When interpreting the results it should be noted that the choice of B* impacts the performance measures and the results therefore are better interpreted based on the buffer conditions when the classifier predicts low buffer conditions.

TABLE 3

Best classifier configuration and evaluation results for the threshold-base classifiers.

|  | Training | | | | Evaluation | | |
|---|---|---|---|---|---|---|---|
|  | a | $X_a^*$ (Kbits/s) | $T_a^X$ | F1 score | Sensitivity | Precision | F1 score |
| Synthetic trace with B* = 0 | 0.15 | 400 | 5 | 0.49 | 0.49 | 0.59 | 0.49 |
| Synthetic trace with B* = 5 | 0.5 | 550 | 20 | 0.28 | 0.77 | 0.53 | 0.51 |
| Synthetic trace with B* = 10 | 0.3 | 600 | 25 | 0.40 | 0.7 | 0.66 | 0.57 |
| Synthetic trace with B* = 20 | 0.2 | 550 | 25 | 0.59 | 0.58 | 0.72 | 0.55 |
| Synthetic trace with B* = 40 | 0.25 | 300 | 10 | 0.71 | 0.62 | 0.73 | 0.58 |
| Real trace with B* = 0 | 0.45 | 800 | 25 | 0.37 | 0.37 | 0.66 | 0.40 |
| Real trace with B* = 5 | 0.15 | 600 | 5 | 0.16 | 0.63 | 0.46 | 0.48 |
| Real trace with B* = 10 | 0.05 | 900 | 10 | 0.35 | 0.72 | 0.73 | 0.67 |
| Real trace with B* = 20 | 0.1 | 850 | 20 | 0.61 | 0.53 | 0.72 | 0.55 |
| Real trace with B* = 40 | 0.15 | 900 | 20 | 0.70 | 0.62 | 0.85 | 0.65 |

Figure 17B:
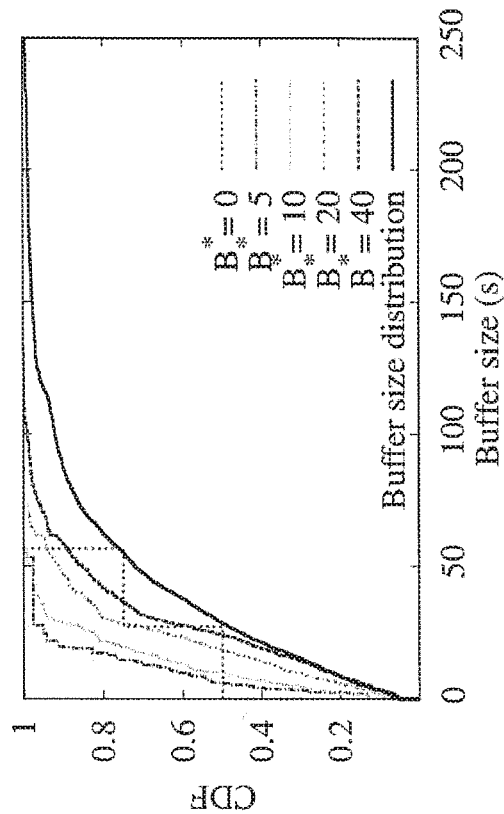
FIG. 17B is a real trace for varying buffer conditions.
Figure 17A:
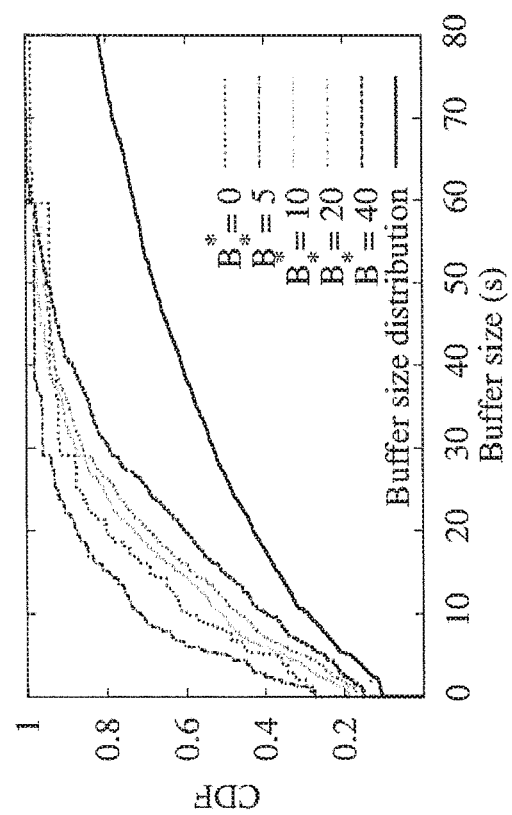
FIG. 17A is a synthetic trace for varying buffer conditions.

FIG. 17 shows the CDF of the buffer conditions as seen when the threshold-based online classifiers predicted low buffer conditions, and put them in contrast to the buffer conditions as observed over all playback sessions. The substantial differences in the CDFs is encouraging as it shows that relatively simple classifiers can be useful in predicting low buffer conditions even when the traffic is encrypted.

The machine learning classifier results are summarized in Table 4. This experiment used a boosted decision tree classifier in Microsoft Azure Machine Learning. The classifier improved noticeably over the simple threshold-based classifiers for cases when intermediate to large B* values (e.g. 20 or 40) were used. The small B* values exhibited less accurate results.

TABLE 4

Evaluation results with the boosted decision tree classifier

|  | Sensitivity | Precision | F1 score |
|---|---|---|---|
| Synthetic trace with B* = 0 | 0.487 | 0.268 | 0.346 |
| Synthetic trace with B* = 5 | 0.43 | 0.52 | 0.47 |
| Synthetic trace with B* = 10 | 0.55 | 0.47 | 0.51 |

TABLE 4-continued

Evaluation results with the boosted decision tree classifier

|  | Sensitivity | Precision | F1 score |
|---|---|---|---|
| Synthetic trace with B* = 20 | 0.748 | 0.634 | 0.686 |
| Synthetic trace with B* = 40 | 0.582 | 0.898 | 0.775 |
| Real trace with B* = 0 | 0.097 | 0.308 | 0.067 |
| Real trace with B* = 5 | 0.17 | 0.39 | 0.24 |
| Real trace with B* = 10 | 0.52 | 0.53 | 0.52 |
| Real trace with B* = 20 | 0.856 | 0.611 | 0.713 |
| Real trace with B* = 40 | 0.820 | 0.815 | 0.818 |

As discussed above, the low-to-intermediate buffer cases (e.g., using B*=20) are likely of more interest for real-time optimization techniques. The better accuracy for these cases can be explained by richer and more balanced training data. For example, the ratio of instances where the buffer size was less than or equal to B*=20 was 0.441 for the synthetic trance and 0.358 for the real trace. With B*=40 the corresponding ratios were 0.694 and 0.826, respectively.

FIG. 18 shows the CDF of buffer conditions when the boosted decision tree classifier use different B* values. Interestingly, although the classifier had a poor F1 score for the synthetic cases with B*=0, we note that a significant amount of the instances identified are cases where the buffer size is less than 20 seconds. This suggests that this classifier can be used to identify low buffer conditions even with B*=0. For other values of B^*, the classifier again performs better owing to the richer training data and more relaxed constraints. Overall, these results show that the boosted decision tree classifier provides a good tool to predict instances with low buffer conditions. By careful selection of B* we can also achieve a good tradeoff between the number of flagged low buffer instances and the accuracy with which these are reported. While these are reported. While the machine learning classifiers in general do not provide the same intuition as the threshold-based classifiers, which easily can be interpreted based on the threshold they end up selecting, we note that the boosted decision tree classifier wins in terms of accuracy and is easy to implement as a real-time classifier using existing software packages. Other tests evaluated different machine learning techniques, such as Support Vector Machines (SVM), on our dataset. The boosted decision tree classifier outperforms the SVM classifier when looking across performance scores for different values of B*, especially for B*=0, B*=5 and B*=10. For larger thresholds, B*=20 and B*=40, the SVM classifier delivers very similar results, and in general, when compared to the boosted decision tree, has a slightly lower sensitivity and higher precision.

EXAMPLES

Example 1

A buffer classification system comprising: a buffer emulator; a metrics calculator; a learning module; a training module; a classification module, wherein the buffer emulator is connected to a proxy on a network, the proxy is in communication with a client and a server; the buffer emulator and metrics calculator are connected to the proxy; the buffer emulator emulating a buffer condition of the proxy; the metrics calculator is configured to obtain at least one measurement from a flow between the proxy and the client; wherein the learning module is configured to map the buffer condition to the at least one measurement, and communicates a mapped metric to the training module; wherein the training module is configured to define at least one classifier rule to predict a buffer condition from a calculated metric, and wherein the training module transmits the at least one classifier rule to a classifier module, the classifier module having an input configured to receive a user flow, the classifier being configured to apply the at least one classifier rule to predict a buffer condition based on the user flow.

Example 2

The system of example 1 wherein the proxy is a trusted proxy.

Example 3

The system of example 1, wherein the learning module includes a threshold based classifier configured to map the buffer condition to the at least one measurement.

Example 4

The system of example 1, wherein the learning module includes a machine learning classifier.

Example 5

The system of example 4, wherein the machine learning classifier includes a decision tree classifier.

Example 6

The system of example 5, wherein the decision tree classifier is a boosted decision tree classifier.

Example 7

The system of example 1 further comprising an output connected to a network operator workstation, wherein the classifier module communicates the predicted buffer condition for the user flow to the network operator workstation via the output.

Example 8

The system of example 7, wherein the at least one classifier rule defines an undesired buffer condition, and wherein when the classifier module predicts the buffer condition will fall within the undesired buffer condition, the classifier module transmits an alert via the output.

Example 9

The system of example 7, wherein the network operator work station communicates with a network and is configured to take an action based on the predicted buffer condition.

Example 10

The system of example 9, wherein the action includes at least one of providing more capacity for the user flow, assign a higher priority to the user flow on the network, increasing a bandwidth for the user flow, throttling the user flow, and sending an alert signal to the user or client.

Example 11

A network device comprising: a processor, an input/output device coupled to the processor, and a memory coupled with the processor, the memory comprising executable instructions that when executed by the processor cause the processor to effectuate operations comprising: instantiating a buffer emulator; instantiating a first metrics calculator; connecting the buffer emulator and first metrics calculator to the trusted proxy, wherein the buffer emulator emulates a buffer condition in the trusted proxy based on a trusted proxy flow, and wherein the first metrics calculator measures flow metrics from the trusted proxy flow; mapping the flow metrics and the buffer condition from the trusted proxy to define at least one classifier rule; and applying the at least one classifier rule to a user flow to define a buffer condition for the user flow.

Example 12

The network device of example 11, the operations further comprising instantiating a learning module including at least one of a threshold classifier and a machine learning classifier; connecting the learning module to the buffer emulator and the first metrics calculator; and wherein the mapping step includes applying at least one of the threshold classifier and machine learning classifier to the trusted proxy flow, an emulated ground truth and the calculated metrics.

Example 13

The network device of example 12, the operations further comprising instantiating a training module connected to the learning module, wherein the training module trains the learning module to estimate a buffer condition from the trusted proxy flow to define the classifier rule.

Example 14

The network device of example 11, the operations further comprising instantiating a classifier module as a virtual network function, wherein the classifier module receives the at least one classifier rule; instantiating a second metric calculator connected to the classifier module; and obtaining calculated metrics from the user flow via the second metric calculator; and applying the at least one classifier rule to the calculated metrics via the classifier module.

Example 15

The network device of example 11, wherein the buffer condition includes at least one of an estimated buffer occupancy, a buffer depletion rate, a network condition contributing to a stall, and a time until buffer depletion.

Example 16

The network device of example 11, the operations further comprising transmitting the buffer condition to at least one of a network operator work station, a network element, and a memory.

Example 17

The network device of example 11, the operations further comprising performing an action in response to the buffer condition.

Example 18

The network device of example 17, wherein the action includes at least one of providing more capacity for the user flow, assign a higher priority to the user flow on the network, increasing a bandwidth for the user flow, throttling the user flow, and sending an alert signal to the user or client.

Example 19

A method comprising: instantiating a buffer emulator; instantiating a first metrics calculator; connecting the buffer emulator and first metrics calculator to a trusted proxy, wherein the buffer emulator emulates a buffer condition in the trusted proxy based on a trusted proxy flow, and wherein the first metrics calculator measures flow metrics from the trusted proxy flow; mapping the flow metrics and the buffer condition from the trusted proxy to define at least one classifier rule; and applying the at least one classifier rule to a user flow to define a buffer condition for the user flow.

Example 20

The method of example 19, wherein the mapping step includes applying at least one of a threshold classifier, a machine learning classifier, and a boosted decision tree classifier to define the at least one classifier rule.

What is claimed is:

1. A device comprising:
a processor;
a memory coupled with the processor, the memory comprising executable instructions that when executed by the processor cause the processor to effectuate operations comprising; and
in response to receiving first packet level data, calculating first flow metrics for a first flow;
in response to receiving HTTP information, generating buffer emulation data;
creating one or more data training sets using the first flow metrics and buffer emulation data, wherein training data used to create the one or more training data sets is further generated by computing an average throughput per second observed over different time windows during a video playback;
in response to creating the one or more training data sets, generating one or more classifier rules used to determine a buffer condition of a flow;
in response to receiving second packet level data, calculating second flow metrics for a second flow; and
predicting a buffer condition for the second flow based on the second flow metrics and the one or more classifier rules.

2. The device of claim 1, wherein the processor effectuates further operations comprising, based on an indication of a negative impact on a quality of experience (QOE), generating an alert.

3. The device of claim 2, wherein the processor effectuates further operations comprising changing a priority level of the second flow.

4. The device of claim 1, wherein the one or more classifier rules define an undesired buffer condition, and wherein predicting a buffer condition comprises determining whether the buffer condition will fall within the undesired buffer condition.

5. The device of claim 4, based on the predicted buffer condition falling within the undesired buffer condition, performing offloading or power management.

6. The device of claim 4, based on the predicted buffer condition falling within the undesired buffer condition, optimizing a client providing the second flow.

7. The device of claim 4, based on the predicted buffer condition falling within the undesired buffer condition, increasing a transmission bandwidth used for the second flow.

8. The device of claim 1, wherein the processor effectuates further operations comprising:
generating a report of the second flow based on the predicted buffer condition at predetermined time intervals, wherein the report is used to evaluate a quality of experience (QOE) within a network; and
comparing the report with a second report to determine whether a change in a relative time difference between a current video playtime and a time elapsed since beginning video playback has occurred.

9. The device of claim 1, the processor effectuates further operations comprising determining an occurrence of a change, wherein the occurrence of the change is indicative of a stall.

10. The device of claim 1, wherein the processor effectuates further operations comprising, in response to an occurrence of a change, calculating a total stall duration or a stall duration ratio.

11. The device of claim 1, wherein the buffer emulation data comprises an emulation of buffer conditions over an entire video playback session.

12. A non-transitory computer-readable storage medium comprising executable instructions that when executed by a processor cause the processor to effectuate operations comprising:
in response to receiving first packet level data, calculating first flow metrics for a first flow;
in response to receiving HTTP information, generating buffer emulation data;
creating one or more data training sets using the first flow metrics and buffer emulation data, wherein training data used to create the one or more training data sets is further generated by computing an average throughput per second observed over different time windows during a video playback;
in response to creating the one or more training data sets, generating one or more classifier rules used to determine a buffer condition of a flow;
in response to receiving second packet level data, calculating second flow metrics for a second flow; and
predicting a buffer condition for the second flow based on the second flow metrics and the one or more classifier rules.

13. The computer-readable storage medium of claim 12, further comprising, based on the predicted buffer condition indicating a negative impact on a quality of experience (QOE), generating an alert.

14. The computer-readable storage medium of claim 13, further comprising changing a priority level of the second flow.

15. The computer-readable storage medium of claim 12, wherein the one or more classifier rules define an undesired buffer condition, and wherein predicting a buffer condition comprises determining whether the buffer condition will fall within the undesired buffer condition.

16. The computer-readable storage medium of claim 15, based on the predicted buffer condition falling within the undesired buffer condition, performing offloading or power management.

17. The computer-readable storage medium of claim 15, based on the predicted buffer condition falling within the undesired buffer condition, optimizing a client providing the second flow.

18. The computer-readable storage medium of claim 15, based on the predicted buffer condition falling within the undesired buffer condition, increasing a transmission bandwidth used for the second flow.

19. The computer-readable storage medium of claim 12, further comprising, comparing the report with a second report to determine whether a change in a relative time difference between a current video playtime and a time elapsed since beginning video playback has occurred.

20. A method comprising:
- in response to receiving first packet level data, calculating, by a processor, first flow metrics for a first flow;
- in response to receiving HTTP information, generating, by the processor, buffer emulation data;
- creating, by the processor, one or more data training sets using the first flow metrics and buffer emulation data, wherein training data used to create the one or more training data sets is further generated by computing an average throughput per second observed over different time windows during a video playback;
- in response to creating the one or more training data sets, generating, by the processor, one or more classifier rules used to determine a buffer condition of a flow;
- in response to receiving second packet level data, calculating, by the processor, second flow metrics for a second flow; and
- predicting, by the processor, a buffer condition for the second flow based on the second flow metrics and the one or more classifier rules.

* * * * *